US007946163B2

(12) United States Patent
Gartner

(10) Patent No.: US 7,946,163 B2
(45) Date of Patent: May 24, 2011

(54) METHODS AND APPARATUS FOR DEVELOPING A VEHICLE SUSPENSION

(75) Inventor: Bill J. Gartner, Wyomissing, PA (US)

(73) Assignee: Penske Racing Shocks, Reading, PA (US)

( * ) Notice: Subject to any disclaimer, the term of this patent is extended or adjusted under 35 U.S.C. 154(b) by 227 days.

(21) Appl. No.: 12/061,568

(22) Filed: Apr. 2, 2008

(65) Prior Publication Data

US 2008/0250844 A1 Oct. 16, 2008

Related U.S. Application Data

(60) Provisional application No. 60/909,627, filed on Apr. 2, 2007.

(51) Int. Cl.
*G01M 17/04* (2006.01)
(52) U.S. Cl. .................................... 73/117.03; 73/11.04
(58) Field of Classification Search ............... 73/11.04, 73/11.07, 11.08, 11.09, 117.01, 117.03
See application file for complete search history.

(56) References Cited

U.S. PATENT DOCUMENTS

| | | | |
|---|---|---|---|
| 2,765,054 A | 10/1956 | Rossman | |
| 3,689,103 A | 9/1972 | Meulendyk | |
| 3,690,145 A | 9/1972 | Brisard | |
| 3,743,222 A | 7/1973 | Smith | |
| 3,792,604 A | 2/1974 | Fader et al. | |
| 3,811,316 A | 5/1974 | Amendolia | |
| 3,877,347 A | 4/1975 | Sheesley et al. | |
| 3,902,352 A | 9/1975 | Buzzi | |
| 3,937,058 A | 2/1976 | Hillbrands | |
| 3,981,174 A | 9/1976 | Himmler | |
| 4,103,532 A | 8/1978 | Buzzi | |
| 4,111,033 A | 9/1978 | Bolliger | |
| 4,365,770 A | 12/1982 | Mard et al. | |
| 4,376,387 A | 3/1983 | Stevens et al. | |
| 4,648,490 A | 3/1987 | Bergloff | |
| 4,655,440 A | 4/1987 | Eckert | |
| 4,761,991 A | 8/1988 | Fembock | |
| 4,786,034 A | 11/1988 | Heess et al. | |
| 4,815,575 A | 3/1989 | Murty | |
| 4,887,699 A | 12/1989 | Ivers et al. | |
| 4,898,264 A | 2/1990 | Miller | |

(Continued)

FOREIGN PATENT DOCUMENTS

EP 0392784 12/1993

(Continued)

OTHER PUBLICATIONS

Kowalczyk, "Damper Tuning with the use of a Seven Post Shaker Rig," SAE 2002-01-0804, 2002 World Congress, Detroit, Mar. 4-7, 2002.

(Continued)

*Primary Examiner* — Eric S McCall
(74) *Attorney, Agent, or Firm* — John V. Daniluck; Bingham McHale LLP

(57) ABSTRACT

An electronically adjustable shock absorber, and a system, method, and algorithm for developing a vehicle suspension. The shock absorber has damping characteristics that can be adjusted electronically to match a desired set of damping characteristics. The test method includes closed loop control of the electronically adjustable shock to achieve user-provided damping characteristics. The characteristics can be selected from a graphical user interface to simulate different internal flow passages of a shock absorber. Some embodiments make possible the simulated testing of different hardware embodiments, without the need to make the actual shock absorbers and without the need interrupt the vehicle suspension testing for multiple shock absorber installations.

36 Claims, 23 Drawing Sheets

U.S. PATENT DOCUMENTS

| | | |
|---|---|---|
| 4,900,056 A | 2/1990 | Fukushima |
| 4,921,080 A | 5/1990 | Lin |
| 5,056,024 A | 10/1991 | Stuyts |
| 5,069,420 A | 12/1991 | Stobbs et al. |
| 5,082,309 A | 1/1992 | Schutzner et al. |
| 5,088,761 A | 2/1992 | Takehara |
| 5,097,419 A | 3/1992 | Lizell |
| 5,147,018 A | 9/1992 | Kobori et al. |
| 5,161,653 A | 11/1992 | Hare, Sr. |
| 5,188,390 A | 2/1993 | Clark |
| 5,189,615 A | 2/1993 | Rubel et al. |
| 5,205,581 A | 4/1993 | Kallenbach et al. |
| 5,222,759 A | 6/1993 | Wanner et al. |
| 5,285,876 A | 2/1994 | Shimizu et al. |
| 5,324,068 A | 6/1994 | Kallenback et al. |
| 5,346,242 A | 9/1994 | Karnopp |
| 5,369,974 A | 12/1994 | Tsymberov |
| 5,375,683 A | 12/1994 | Huang et al. |
| 5,392,885 A | 2/1995 | Patzenhauer et al. |
| 5,394,731 A | 3/1995 | Shechet et al. |
| 5,396,973 A | 3/1995 | Schwemmer et al. |
| 5,452,209 A | 9/1995 | Dinkelacker et al. |
| 5,454,452 A | 10/1995 | Ohlin |
| 5,486,018 A | 1/1996 | Sakai |
| 5,527,060 A | 6/1996 | Kutsche |
| 5,569,836 A | 10/1996 | Hill |
| 5,588,510 A | 12/1996 | Wilke |
| 5,648,902 A | 7/1997 | Honda |
| 5,665,901 A | 9/1997 | Ilzig |
| 5,670,872 A | 9/1997 | Van De Walle et al. |
| 5,756,877 A | 5/1998 | Nozaki |
| 5,767,382 A | 6/1998 | Buchanan |
| 5,873,437 A | 2/1999 | Danek |
| 5,942,673 A | 8/1999 | Horiuchi et al. |
| 5,956,951 A | 9/1999 | O'Callaghan |
| 6,082,720 A | 7/2000 | Ducloux et al. |
| 6,112,866 A | 9/2000 | Boichot et al. |
| 6,161,419 A | 12/2000 | Langlechner |
| 6,293,377 B1 | 9/2001 | Okada et al. |
| 6,314,353 B1 | 11/2001 | Ohsaku et al. |
| 6,360,580 B1 | 3/2002 | Muller |
| 6,416,016 B1 | 7/2002 | Welsh |
| 6,556,907 B1 | 4/2003 | Sakai |
| 6,634,862 B2 | 10/2003 | Terpay et al. |
| 6,718,270 B2 | 4/2004 | Horiuchi et al. |
| 6,732,033 B2 | 5/2004 | LaPlante et al. |
| 6,736,245 B2 | 5/2004 | Brown |
| 6,755,113 B2 | 6/2004 | Shih |
| 6,868,946 B2 | 3/2005 | Kock et al. |
| 6,904,344 B2 | 6/2005 | LaPlante et al. |
| 6,935,206 B2 | 8/2005 | Alleai |
| 6,953,108 B2 | 10/2005 | Anderfaas et al. |
| 7,172,057 B2 | 2/2007 | Gundermann et al. |
| 7,299,112 B2 | 11/2007 | LaPlante et al. |
| 7,321,816 B2 | 1/2008 | Lauwerys et al. |
| 7,340,334 B2 | 3/2008 | Izawa et al. |
| 7,413,063 B1 | 8/2008 | Davis |
| 7,483,775 B2 | 1/2009 | Karaba et al. |
| 2004/0020355 A1 | 2/2004 | Shih |
| 2004/0090020 A1 | 5/2004 | Braswell |
| 2004/0163904 A1 | 8/2004 | Anderfaas |
| 2005/0071060 A1 | 3/2005 | Lauwerys et al. |
| 2005/0082127 A1 | 4/2005 | Barber |
| 2005/0085969 A1 | 4/2005 | Kim |
| 2005/0121273 A1 | 6/2005 | Hamers |
| 2006/0074533 A1 | 4/2006 | Karaba et al. |

FOREIGN PATENT DOCUMENTS

| | | |
|---|---|---|
| EP | 0401239 | 3/1994 |
| EP | 0337797 | 11/1994 |
| EP | 0607545 | 3/1998 |
| EP | 1296082 | 4/2006 |
| JP | 60113711 | 6/1985 |
| JP | 06247121 | 9/1994 |
| WO | 9959860 | 11/1999 |
| WO | 03069183 | 8/2003 |
| WO | 2005036014 | 4/2005 |
| WO | 2006052657 | 5/2006 |
| WO | 2007097699 | 8/2007 |
| WO | 2010002314 | 1/2010 |
| WO | 2010112487 | 10/2010 |

OTHER PUBLICATIONS

Oral, "A tool for Control Algorithm Development of an Active Vehicle Suspension Using Hardware-in-The-Loop," SAE 2002-01-1597, SAE Automotive Dynamics and Stability Conference and Exhibition, Detriot, May 7-9, 2002.

Kelly et al., "Track Simulation and Vehicle Characterization with 7 Post Testing," SAE 2002-01-3307, Motorsports Engineering Conference & Exhibition, Indianapolis, Dec. 2-5, 2002.

Kasprzak et al, "Use of Simulation to Tune Race Car Dampers," SAE 942504, Dec. 1994.

CNC Machining, Winter 1999, vol. 3, No. 8, 19 pages.

"GM Technology: Chassis," 3 pgs from http://www.gm.com/company/racing/technology/ALMSChasis.htm.

MOOG Actuator Product Guide, Jul. 2006, 8 pages.

MOOG High Performance Solenoids Product Guide, 2006, 4 pages.

MOOG Electrohydraulic Valves . . . A Technical Look, date unknown, 24 pages.

MOOG The most recognized name in Servo and Proportional Valves, date unknown, 10 pages.

"Newman Haas Racing and Enterprise Simulation—The winning Combination," Alpha Magazine, Jul. 2006, vol. 9 (printed from Alpha Magazine's web site), 6 pages.

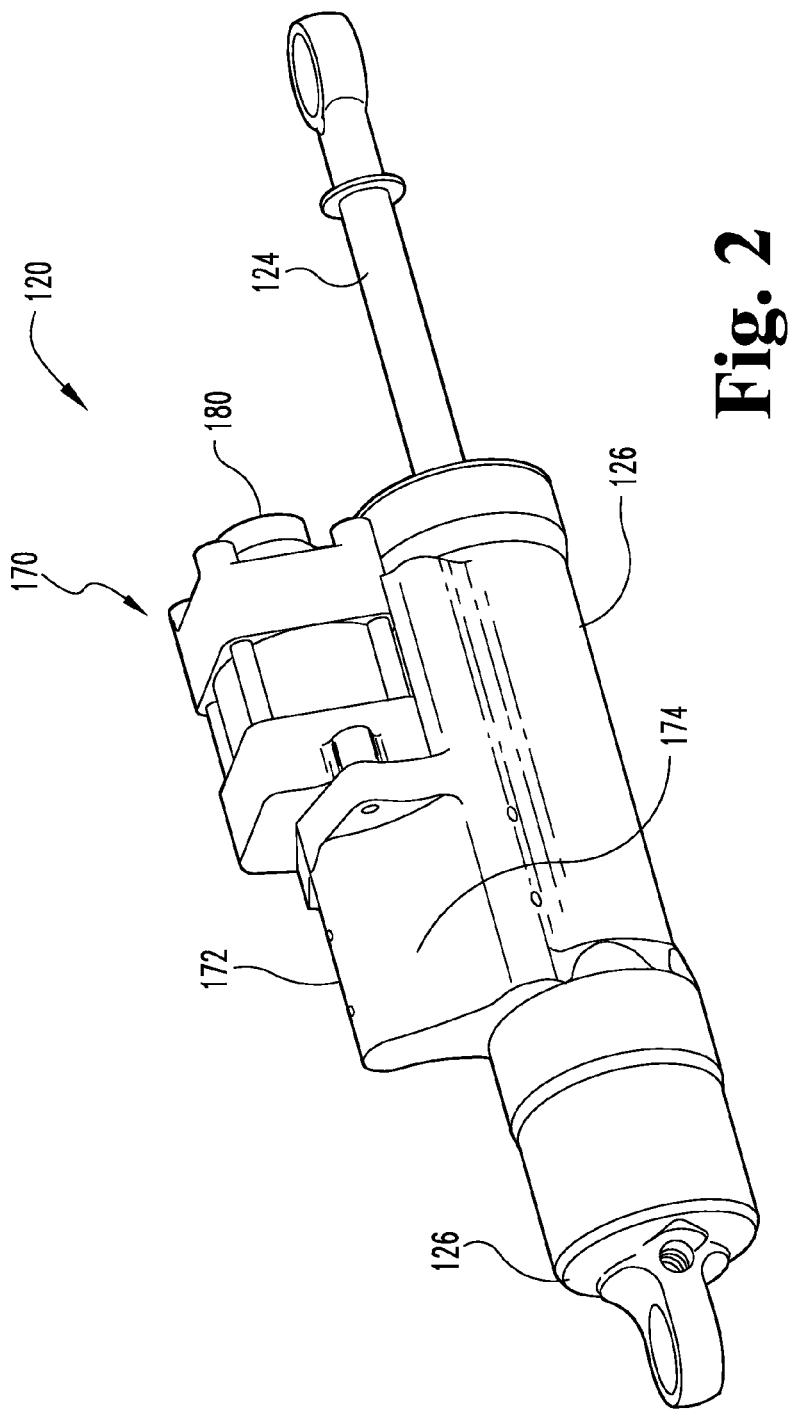

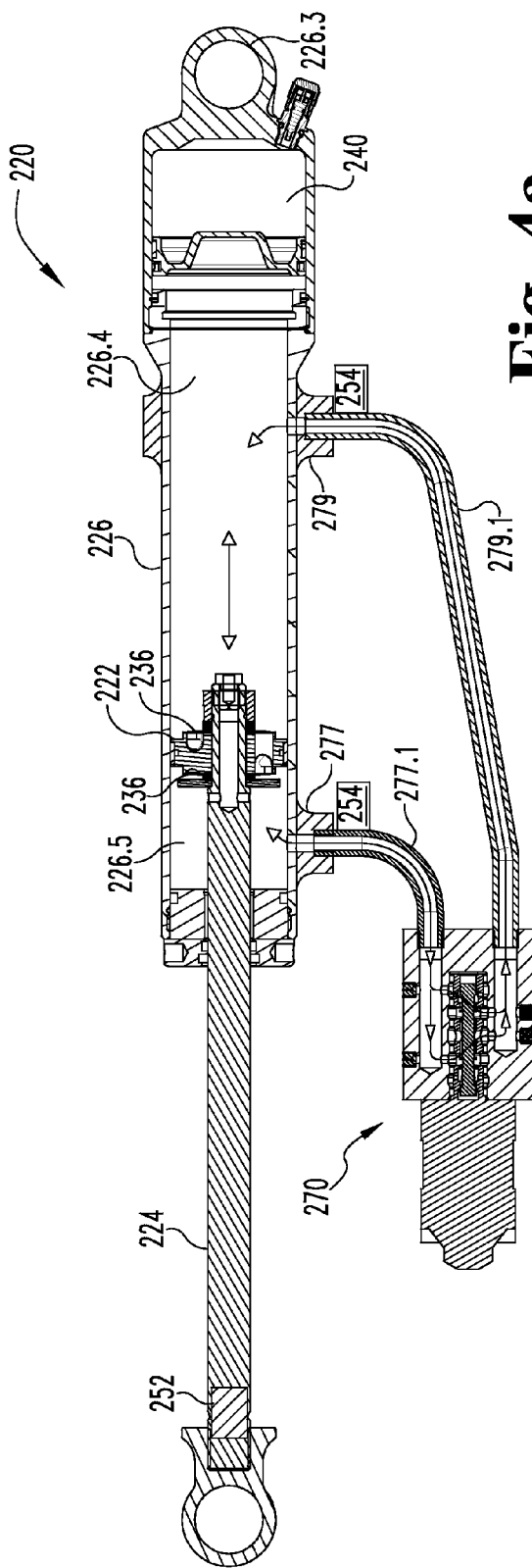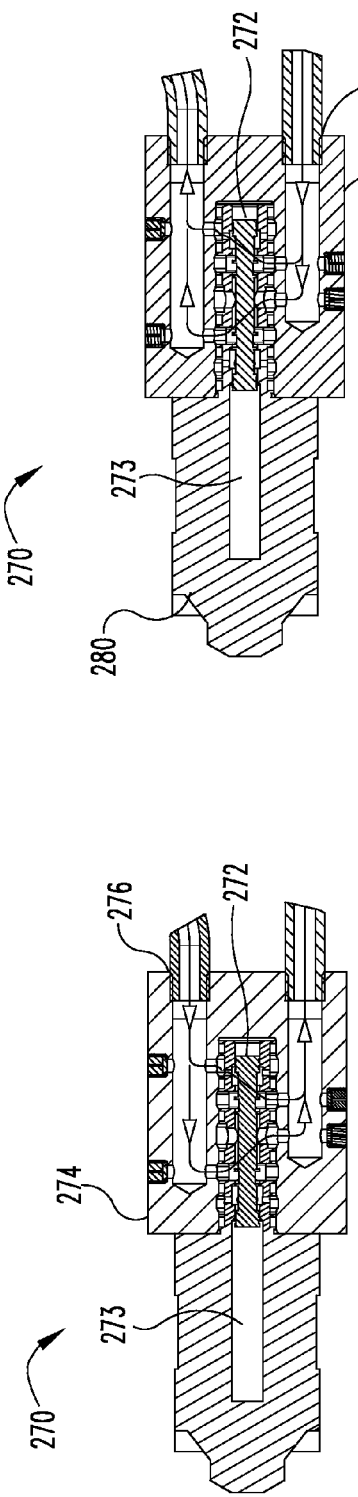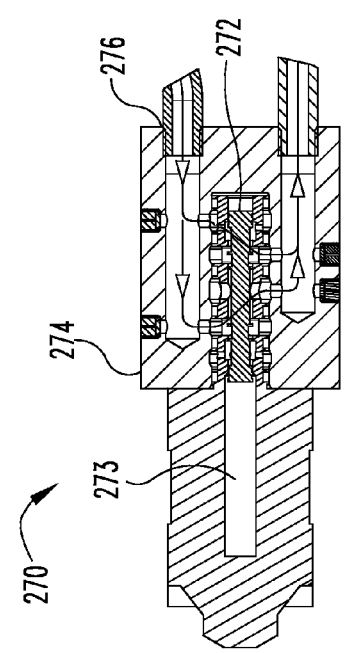

US 7,946,163 B2

METHODS AND APPARATUS FOR DEVELOPING A VEHICLE SUSPENSION

CROSS REFERENCE TO RELATED APPLICATION

This application claims the benefit of priority to U.S. Provisional Patent Application Ser. No. 60/909,627, filed Apr. 2, 2007, and incorporated herein in its entirety.

FIELD OF THE INVENTION

The present invention pertains to improvements in shock absorbers, and to improvements in methods for developing vehicle suspensions. More particularly, some embodiments pertain to electronically adjustable shock absorbers, or to methods, software, or systems for laboratory development and on-road development of vehicle suspensions.

BACKGROUND OF THE INVENTION

Shock absorbers include numerous features (such as one-way valves, flow restrictions, inertia valves, etc.) that effect the fluid flow and damping characteristics of the shock absorber, and therefore effect the attitude of the vehicle frame suspended from the shock absorbers. In some fields of endeavor such as automobile racing, it is critical to finely tune the flow characteristics of the shock absorber, and thus the characteristics of the vehicle, on a recurring basis. In some cases, this fine tuning is performed by operating the vehicle on a race track and noting its performance as shock absorbers are changed or modified during a course of testing. However, it is expensive to operate race cars under racing conditions.

To reduce the cost of renting a track and providing a large crew, one alternative is to test the vehicle in a laboratory, such as on a seven-post test rig. On such rigs, it is not necessary to drive the car and operate the engine, and the movement of the car is simulated by a plurality of hydraulic actuators that apply loads to the vehicle. For example, each wheel can be operated vertically by its own vertical hydraulic actuator. Although rig testing is cheaper than field testing, it is nonetheless expensive to rent time on large, highly instrumented test rigs. Further, it is still necessary to manually change the characteristics of the suspension dampers, either by swapping out the shock absorbers, or by using hands or a hand tool to change an external setting on the shock absorber. This testing method is thereby limited to the range of adjustments in the shock absorbers, and also to the types of adjustments that are in the shock absorbers brought to the test session.

What is needed is a method of testing that improves upon existing methods. The present invention does this in novel and unobvious ways.

SUMMARY OF THE INVENTION

Some aspects of the present invention pertain to systems for developing the suspension of a vehicle. The system preferably includes a test rig having multiple actuators to vertically displace the wheels of a vehicle. The shock absorbers of the vehicle are electronically adjustable. An electronic controller varies the damping of a shock absorber based on a signal from a sensor on the shock absorber.

Yet other aspects of the present invention pertain to a method for testing a vehicle suspension. The method includes comparing a measured damping characteristic to a desired damping characteristic, and automatically adjusting the damping of one or more shock absorbers by the user.

Yet another aspect of the present invention pertains to a method for establishing a desired damping characteristic of a shock absorber. The method includes a menu-driven algorithm for establishing the desired damping characteristics of the shock absorbers. In some embodiments the menu includes options for deriving the characteristics by way of tabular data, functional relationships, or graphical relationships.

Yet other aspects of the present invention pertain to an electronically adjustable shock absorber in which fluid passes from one chamber of the shock absorber to the other chamber of the shock absorber through an electronically adjustable valve. In one embodiment the electronically adjustable valve is biased to a partially opened position when the electronic control signal is removed.

Yet another aspect of the present invention pertains to a method for testing a vehicle suspension. The method includes testing an electrically adjustable shock absorber on a dynamometer. The method includes determining a preferred schedule of electronic adjustments such as voltage, current, or position that are functions of the dynamometer operation, such as velocity and displacement of one end of the shock absorber relative to another end of the shock absorber, and storing this schedule on an electronically accessible storage medium.

The various apparatus and methods described throughout this application can be expressed as a large number of different combinations and subcombinations, the explicit expression of each of these myriad combinations being excessive and unnecessary.

These and other features and aspects of different embodiments of the present invention will be apparent from the claims, specification, and drawings.

BRIEF DESCRIPTION OF THE DRAWINGS

FIG. 2 is a perspective external view of a shock absorber according to one embodiment of the present invention.

FIG. 4a is a cutaway of the apparatus of FIG. 3.

FIG. 4b is an enlargement of a portion of the apparatus of FIG. 4a. for a shock absorber undergoing rebound.

FIG. 4c is an enlargement of a portion of the apparatus of FIG. 4a. for a shock absorber undergoing compression.

DESCRIPTION OF THE PREFERRED EMBODIMENT

Figure 1A:
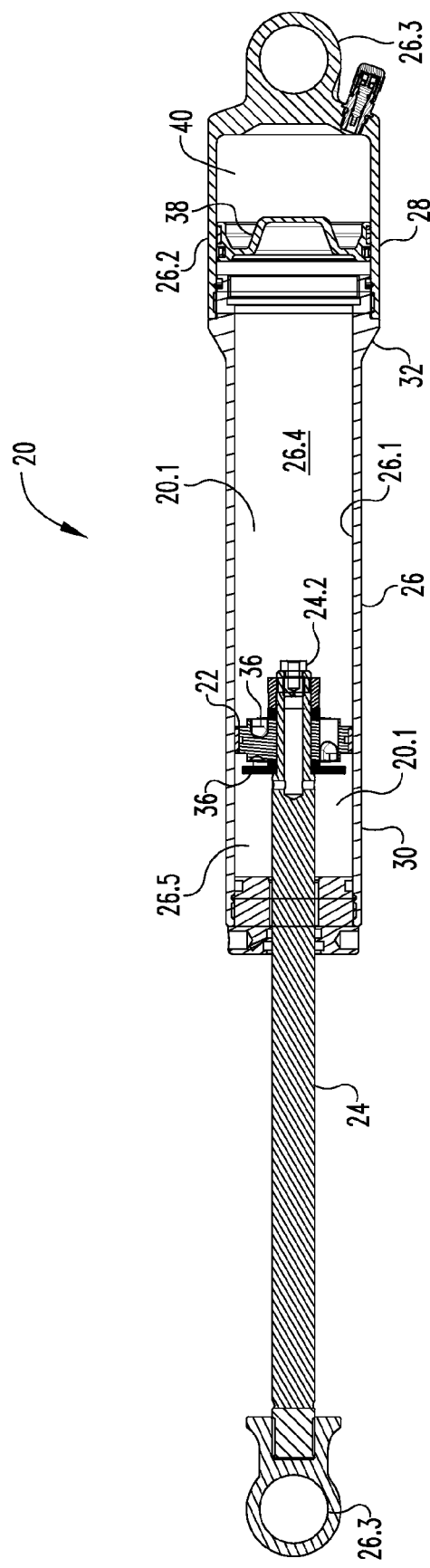
FIG. 1a is a cutaway view of a prior art shock absorber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Various embodiments of the present invention pertain to systems for testing and developing the suspension of a vehicle, such as a motorcycle or automobile. In some embodiments, the apparatus and systems shown herein are applied to vehicles on a roadway, such as a racetrack. In yet other embodiments, the wheels of the vehicle are moved vertically by one or more test actuators. As the wheels are moved, loads are transmitted into the vehicle frame by suspension components such as springs and shock absorbers. Sensors on the shock absorbers measure characteristics of the shock absorbers, such as the load transmitted, the velocity of the rod relative to the cylinder, the position of the rod relative to the cylinder, or the acceleration of the rod relative to the cylinder. A computer receives this data, and in some embodiments also receives a signal corresponding to a damping adjustment of a shock absorber, and transmits a command signal to an actuator of an electronically adjustable shock absorber and adjusts this actuator to produce a desired damping characteristic. In some embodiments, the actuators are part of a testing device such as a seven-post test rig.

One of the embodiment of the present invention pertains to the use of a plurality of predetermined damper force look-up tables or other relationships that establish desired damping characteristics for an electronically controllable shock absorber. In some embodiments, these desired damping characteristics of a simulated or modeled shock absorber are easily obtained by the use of a computer algorithm. The algorithm permits a user to quickly prepare and then implement a variety of different simulated shock absorbers, including simulations of hydraulic valves, simulations including functional relationships of force and velocity, and simulations based on tabular relationships, such as those expressed in a spread sheet.

In one embodiment, an electronic controller such as a computer receives input data regarding the state of certain characteristics of the shock absorber (such as stroking position, stroking velocity, stroking acceleration, damper piston pressure differential, damper force, or the like) and uses that state data to select one of the damping tables and establish a particular damping force as the desired damping force for that particular state of operation. A simulated shock absorber (an electronically controllable shock absorber operated in accordance with these damping characteristics) can be tested on a 7 post rig or in actual driving conditions and if the resultant vehicle characteristics are not desired, a modified data set can be prepared for simulation of a different shock absorber.

As one example of such an embodiment, there are two, predetermined tables, each of which includes a relationship of damping force as a function of stroking velocity. The first table is used for stroking displacements within a particular velocity range. A second table is used for stroking displacements outside of that range. In one embodiment, such a table simulates an internal piston with one way valves in each of the rebound and compression flowpaths, with these one way valves being shimmed differently.

As yet another example of one embodiment of present invention, the user (such as a test engineer) provides a tabular, functional, or other relationship that includes a damping force map as a function stroking velocity and stroking displacement. In one embodiment a first 2-D table is selected if the stroking acceleration of the damper falls within a certain range of measured acceleration, or alternatively, if the sign of acceleration changes. A second table is used for stroking accelerations outside of this range. In yet another embodiment the selection between 2-D tables is based on the product of velocity and acceleration, and in yet other embodiments the selection in based on the sign of the product of velocity and acceleration.

As the term "table" is used herein, it refers to an ordered relationship between two or more variables, including one dimensional, two dimensional, and higher dimensional tables or matrices. As one example, a particular tabular entry within a table can be a specific value of a measurable quantity (such as a force, velocity, pressure, or other), or a coefficient to be used in an equation (such as a coefficient in a polynomial equation or other), or a logical value (such as zero or one), as non-limiting examples.

In yet another embodiment of the present invention, a user (such as a test engineer) can simulate with an electronic controller a hydraulically controlled damper. As one example, the user can electronically and logically construct a damper having a piston with shimmed one-way valves, pistons with regressive characteristics, digressive characteristics, antibottoming components, check valves, pressurized reservoirs, as well as simulated environmental parameters such as ambient temperature and hydraulic fluid temperature.

As one example, this simulated shock absorber is constructed from a graphical user interface that shows images or names of the selected component, or images or names of the function provided by the selected component, and drag or otherwise include these separate features into a composite, simulated shock absorber with desired damping characteristics. An electronic controller then controls an electronically controllable shock absorber to achieve these desired damping characteristic in real time.

Yet other embodiments of the present invention pertain to a method for testing a vehicle suspension. A multi-wheeled vehicle is placed on a test rig having at least one actuator for moving a wheel. As the wheel is moved, measurements are made of vehicle motion and shock absorber damping characteristics. The vehicle motion can be compared to the desired response envelope for the vehicle. The characteristics of the shock absorbers can the be adjusted so that the vehicle responses fall within the desired envelope. In yet other embodiments, the damping characteristics of the shock absorbers are compared to desired damping characteristics, and the damping of the shock absorbers is automatically adjusted to better match the desired damping. As one example, the measured damping characteristic is the position of a damping adjustment valve, and the desired characteristic is the desired position of that valve at a particular piston velocity. As another example, the measured damping characteristic is the force exerted by the damper on the suspension at a predetermined damper relative velocity and the desired characteristic is the desired damping force at that damper velocity.

Although what is shown and described are testing rigs for testing a vehicle, the present invention also contemplates those embodiments in which there is a single suspension system coupled to a single wheel, without attachment to a vehicle frame.

Yet other embodiments of the present invention pertain to a method for testing a vehicle suspension on a roadway. A vehicle including one or more electronically controlled shock absorbers is driven by a driver. The damping characteristics of the electronically controlled shock absorbers are varied by an electronic controller and related software. As the car is driven (for example, on a racing circuit), the damping characteristics can be adjusted by the software. In one embodiment, the damping characteristics can be adjusted remotely, such as by a software operator located in the pit area of the racing circuit and communicating with the electronically controlled dampers by a radio link.

Yet other embodiments of the present invention pertain to a graphical user interface (GUI) for constructing a model of the desired damping characteristics of an electronically adjustable shock absorber. In one embodiment, the GUI operates with an algorithm that permits the user to provide the desired damping characteristics in tabular form, including 2-D, 3-D, and higher dimensional tabular relationships. In yet other embodiments, the desired damping characteristics can be established by multi-variable polynomial equations, such as equations which relate the damping force to various powers of rod velocity and displacement. In yet other embodiments the desired damping characteristics can be constructed as the composite addition of the characteristics of various individual hydromechanical damping elements, such as one-way valves and restricted flow passageways.

Yet other embodiments of the present invention pertain to an electronically adjustable shock absorber. The shock absorber includes an external valve assembly. Hydraulic fluid displaced by the piston of the shock absorber is provided through a port in the cylinder wall to the external valve assembly. The valve assembly includes a valve having flow characteristics that can be changed by an electronic actuator. The fluid displaced from the shock absorber flows through the valve assembly with a pressure drop, and is returned to the other chamber of the shock absorber. Although what is shown and described is an electronically adjustable shock absorber having an actuated valve that is external to the shock absorber's cylinder, the testing systems, methods, and algorithms described herein are not so limited, and contemplate the use of electronically adjustable shock absorbers having actuated valves that are internal to the cylinder.

In yet another embodiment of the present invention there is an electronically adjustable shock absorber that includes an external adjuster. The external adjuster is operatively coupled to a hydraulic valve that is in a flowpath parallel to the flowpath of an electronically adjustable valve assembly. The electronically adjustable valve assembly is operatively connected to one or more actuators that implement commands from an electronic controller. The externally adjustable valve assembly is in parallel with this electronically controllable valve, and this parallel arrangement permits the user to externally adjust the operative range of the electronic controllable valve. In one embodiment, the external adjuster is operatively connected to a needle-type valve placed within a orifice. The external adjuster controls the position of the needle within the orifice, and thereby establishes a fixed flow relationship that is in parallel with variable characteristics of the electronically adjusted valve.

In yet another embodiment of the present invention there is an electronically adjustable shock absorber having a plurality of flow paths in parallel around the flow path of the internal piston. One of these flow paths includes an electronically controllable valve. A second, parallel low path includes a fixed restriction and a solenoid valve. In one embodiment, the solenoid valve is of the on/off type, and either opens this second parallel flow path entirely (and thereby acting as a fixed restriction). In yet another embodiment this solenoid valve is a proportional solenoid valve, which can be adjusted to a position. In one embodiment, the proportional solenoid valve has frequency response that is slower than the frequency response of the electronically controllable valve in the first parallel flow path. In such embodiments the second flow path can be adjusted proportionately to a fixed restriction based on the current flow into the solenoid valve.

Some embodiments to the present invention include an electronically controllable valve that incorporates a solenoid that is actuated if there is a failure of the electronic controller. As one example, a hydraulic shock absorber includes an external flow path that is parallel to the flow path across the piston. This additional flow path includes one or more flow regulating devices, such as check valves and fixed restrictions. In series with these flow regulating components is a normally open solenoid valve that is energized to the closed position by the electronic controller during testing. If the electronic control signal removed (such as if there is a failure of the controller), the solenoid valve will open and the opened, parallel flow path establishes a predictable damping characteristic to minimize the possible loss of control of the vehicle.

In yet other embodiments there is an electronically adjustable shock absorber that includes an electronically controlled valve to accomplish the adjustment. This valve can move from a substantially closed position to a substantially fully opened position, or otherwise between upper and lower limits. In one embodiment, the valve is biased (such as by springs) to a middle position that is intermediate of the first and second positions. In such embodiments, if there is a failure of the electronic controller or the hard wiring, such that the control signal is completely removed, the valve will go to the intermediate position under the influence of the biasing mean, thereby establishing damping protection in the event of failure.

Yet other embodiments of the present invention pertain to a method for testing a shock absorber. In some embodiments, an electrically adjustable shock absorber is tested on a shock absorber dynamometer. The dynamometer is operated to excite the shock absorber with a variety of oscillatory velocity inputs. The shock absorber is adjusted to one or more different damping settings, such as a position of a damping adjustment valve. The instrumentation of the dynamometer provides data corresponding to the damping force exciting the shock absorber as a function of input velocity, or in some embodiments also as a function of the stroke of the shock absorber. In some embodiments a test operator prepares multiple data sets each corresponding to a different hardware embodiment of a shock absorber. In this manner this embodiment makes possible the simulated testing of each of these different hardware embodiments, without the need to make the actual shock absorbers and without the need interrupt the vehicle suspension testing for multiple installations.

FIG. 1 shows a cross-sectional view of a prior art shock absorber 20. A main piston 22 is coupled to a moveable rod 24, piston 22 being slidably received within the inner diameter 26.1 of a main cylinder 26. Piston 22 is retained on the end of rod 24 by a coupling nut 24.2. Main piston 22 generally subdivides the internal volume of cylinder 26 into a compression volume 26.4 located between piston 22 and the compression end 28 of shock 20, and a second rebound volume 26.5 located between piston 22 and the rebound end 30 of shock 20. The movement of piston 22 and rod 24 toward rebound end 32 results in a reduction in the size of compression volume 26.1, and the subsequent flow of hydraulic fluid 20.1 through a compression flowpath 32 in piston 22 and into the simultaneously enlarging rebound volume 26.5. Likewise, movement of piston 22 toward rebound end 30 of shock 20 results in the flow of hydraulic fluid 20.1 through a rebound flowpath 34 in piston 22 and into the simultaneously enlarging compression volume 26.4.

In order to compensate for changes in the density of hydraulic fluid 20.1 and shaft-displaced fluid, shock absorber 20 includes a nitrogen chamber separated by a reservoir piston 38 from the fluid-wetted volume of cylinder 26.

Shock absorber 20 is typically used with the suspension of a vehicle. Rod 24 includes a first suspension attachment 26.3, and end cap 26.2 of cylinder 26 includes a second suspension attachment 26.3. These suspension attachments 26.3 permit the pivotal connection of shock absorber 20 to a portion of the vehicle suspension on one end, and on the other end to a portion of the vehicle frame. It is well known to use shock absorbers on many types of vehicles, including motorcycles, buses, trucks, automobiles, and airplanes. Further, although shock absorber 20 has been referred to for being used on a vehicle, shock absorbers are also known to be used in other applications where it is beneficial to dampen the movement of one object relative to another object, such as dampers for doors.

Compression flowpath 32 includes a fluid passageway interconnecting volumes 26.4 and 26.5 with a one-way valve in the flowpath 32. This one-way valve can be one or more annular shims which are prevented from flexing in one direction (and thus substantially restricting flow), but able to flex in a different direction (and thus allow flow in this opposite direction). Likewise, rebound flowpath 34 provides fluid communication between volumes 26.4 and 26.5 through a one-way valve. Often, the one-way valve of the compression flowpath 32 has different characteristics than the one-way valve of rebound flowpath 34.

Figure 1B:
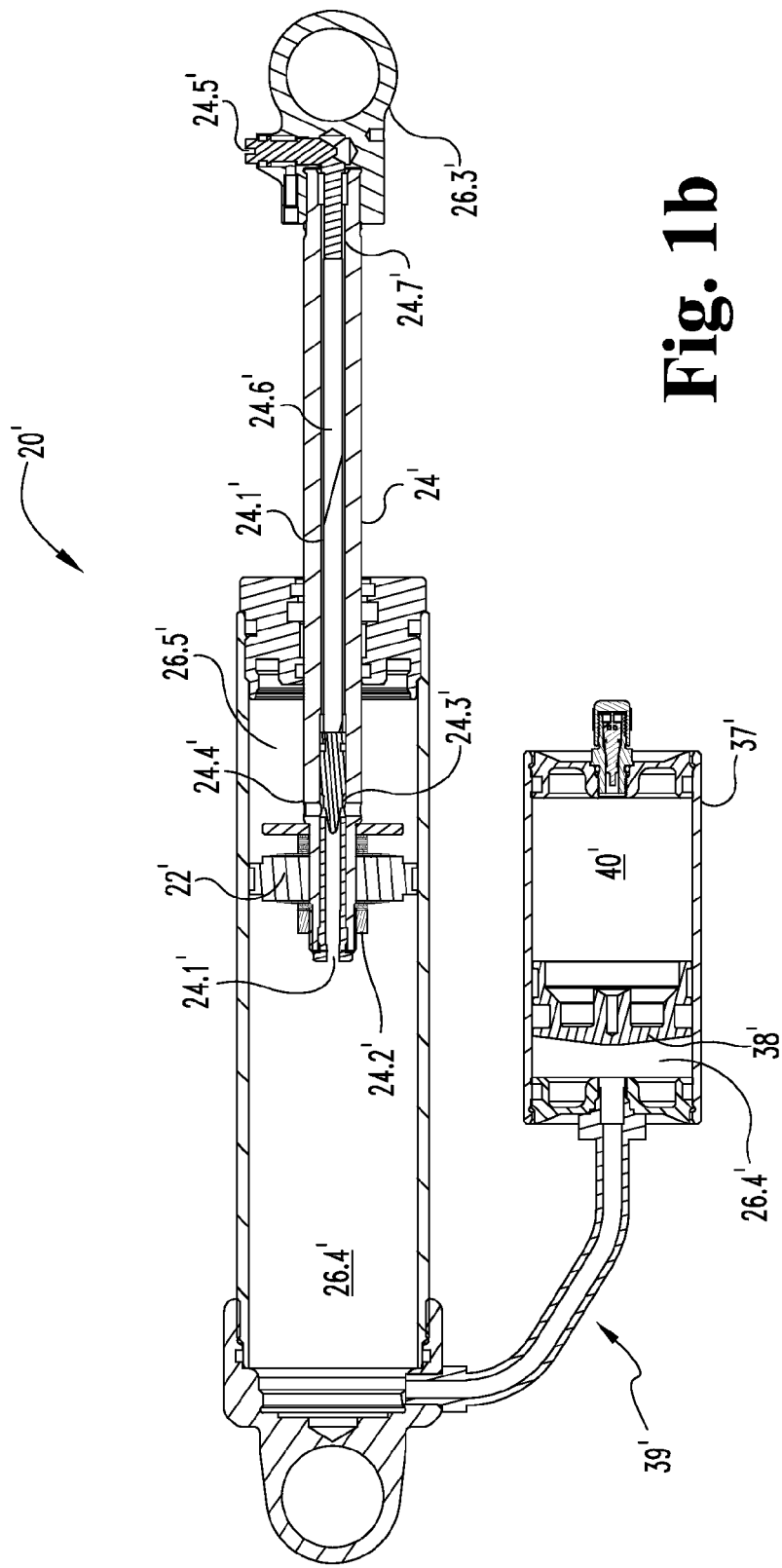
FIG. 1b is a cutaway view of another prior art shock absorber.

FIG. 1b shows a cross-sectional view of a second prior art shock absorber 20'. Shock absorber 20' includes a second, separate cylinder 37' which includes gas reservoir 40'. A piston 38' slidably received within cylinder 37' separates gas volume 40' from compression volume 26.4'. An external fluid connection 39' interconnects the hydraulic fluid end of piston 37' with the compression end of shock absorber 20'. Cylinder 37' includes a gas port in one end of cylinder 37' for entry or removal of nitrogen.

Shock absorber 20' includes means for varying the fluid resistance of a flowpath interconnecting compression volume 26.4' and rebound volume 26.5'. Rod 24' includes an internal passage 24.1' that extends out one end of shaft 24', and extends in the opposite direction towards attachment 26.3'. The open end of internal passage 24.1' is in fluid communication with one or more orifices 24.4' that extend from internal passage 24.1' to rebound volume 26.5'. The flow of fluid through this internal passageway between the compression and rebound volumes is restricted by a metering needle 24.3' received within internal passage 24.1'. The position of metering needle 24.3' can be altered by a pushrod 24.6' also extending within internal passage 24.1'. Push rod 24.6' includes an end 24.7' that is adapted and configured to mate with an internal adjustment screw 24.5'. The inward adjustment of screw 24.5' acts on the angled interface to push rod 24.6' and adjustment needle 24.3' toward a position of increased resistance in the internal flowpath.

Figure 1C:
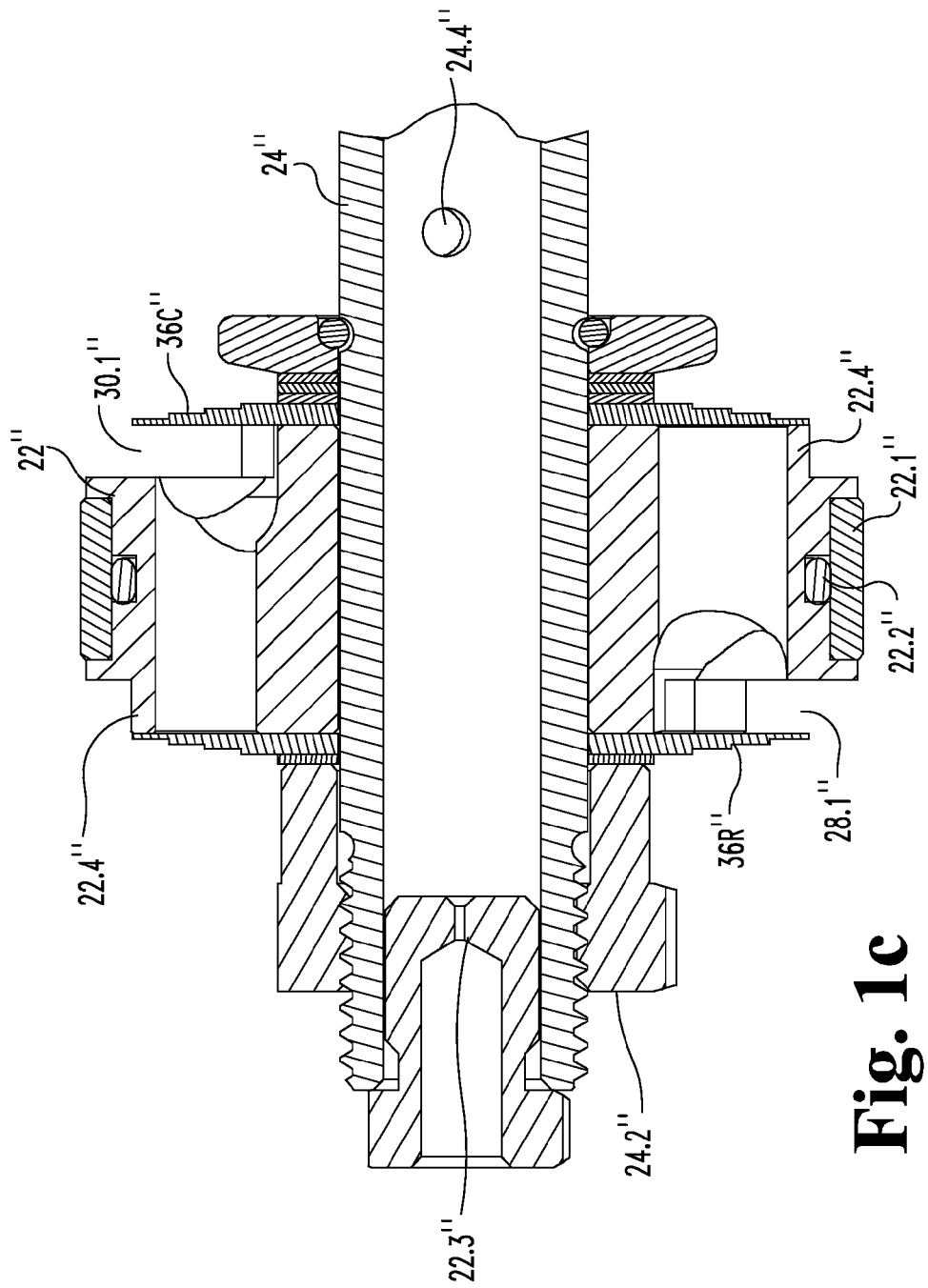
FIG. 1c is a cutaway view of a portion of another prior art shock absorber.

FIG. 1c is a cross sectional view of a portion of another prior art shock absorber. The apparatus in FIG. 1c shows a piston 22" coupled to a shaft 24" by a coupling nut 24.2". Shaft 24" includes an internal flowpath from orifice 22.3" through internal passage 24.1" and into shaft orifice 24.4". This internal flowpath bypasses piston 22".

Piston 22" includes a pair of shim sets 36", each shim set shown including 4 individual washers. During operation in compression (i.e., movement in FIG. 1c toward the left) fluid is able to freely enter compression flowpath 28.1". However, fluid is unable to exit through flowpath 28.1" and into the rebound side of the shock absorber unless fluid pressure is sufficiently great to bend the periphery shim stack 36C" away from the shim edge support 29.4" of piston 22". During operation in rebound, (i.e., movement in FIG. 1c toward the right) fluid is able to freely enter compression flowpath 30.1". However, fluid is unable to exit through flowpath 30.1" and into the compression side of the shock absorber unless fluid pressure is sufficiently great to bend the periphery shim stack 36R" away from the shim edge support 29.4" of piston 22".

A resilient seal 22.1" substantially seals the compressive side of piston 22" from the rebound side of piston 22". An energizing backup seal 22.2" urges seal 22.1" outwardly into contact with the inner wall of the cylinder.

Although what has been shown described is a shock absorber 20 that is linear in operation, the prior art of shock absorbers further includes rotary dampers, such as the toroidal damper disclosed in U.S. Pat. No. 7,048,098, incorporated herein by reference.

As used herein, the word compression refers to the action and direction of the shock absorber during compression of the wheel suspension, this term being synonymous with the term jounce. Therefore, the end of the shock absorber referred to as a compression end is the end which has a reduction in internal volume (due to movement of the piston relative to the cylinder) during compression of the vehicle suspension. The rebound end of the shock absorber is the end that is opposite of the compression end.

The use of a hundred series prefix (N) in front of a two digit element number (XX), indicates an element (NXX) that is the same as the other same two digit elements, except for the changes which are shown and described herein. The use of a thousand series prefix indicates an element or feature of the invention pertaining to the electronic controller or the software.

Figure 3:
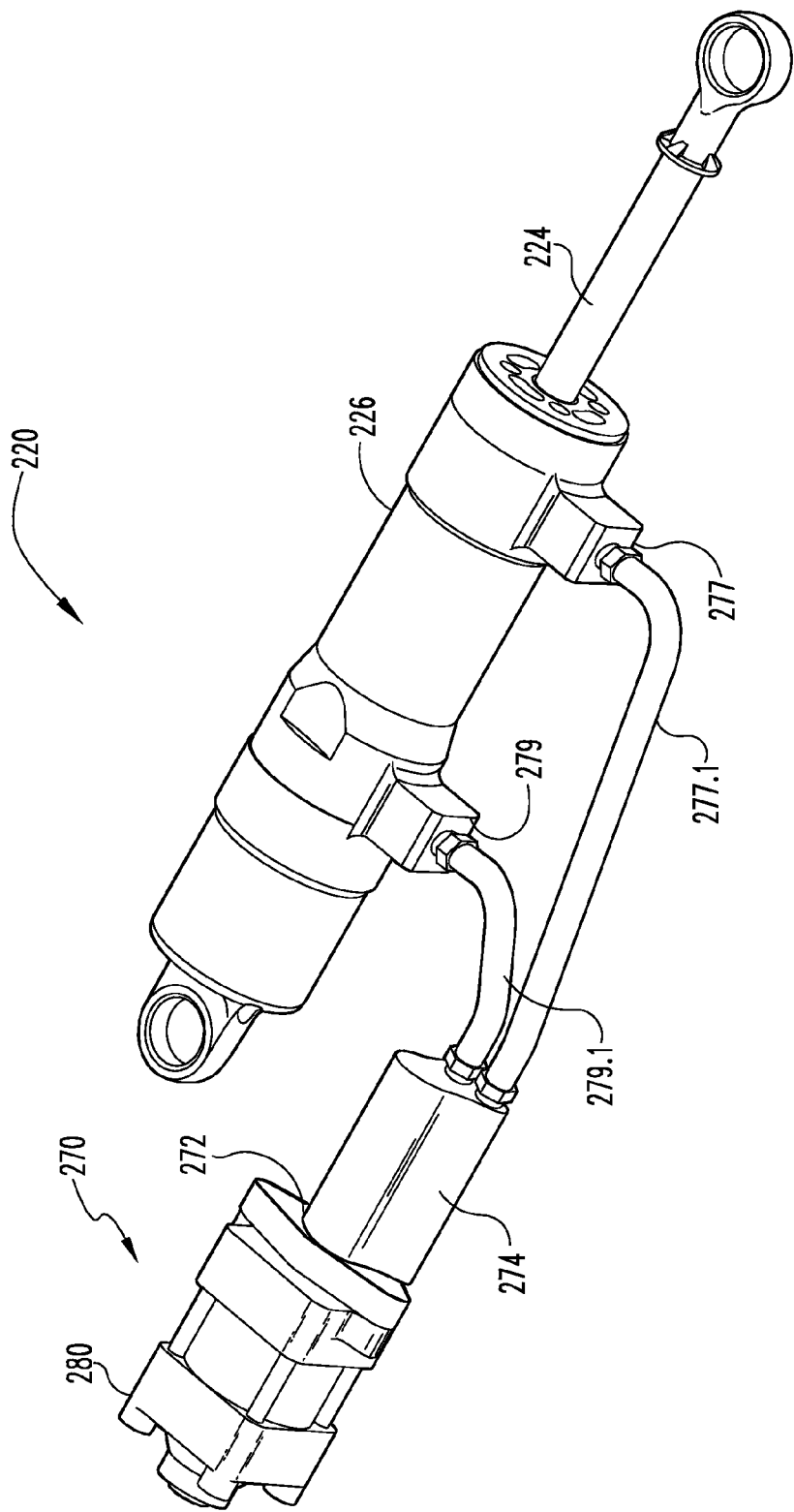
FIG. 3 is a perspective external view of a shock absorber according to another embodiment of the present invention.

FIGS. 2, 3, and 4 depict electronically adjustable shock absorbers according to several different embodiments of the present invention. FIG. 2 shows a shock absorber 120 which has damping characteristics that are electronically adjustable by way of an external valve assembly 170. Valve assembly 170 includes an actuator 180 that is operably coupled to a valve 172 located within a housing 174. Valve assembly 170 is preferably attached to the external surface of cylinder 126, although in some embodiments valve housing 174 is integrally cast with cylinder 126. Valve assembly 170 includes a first fluid port that is in fluid communication with the compression volume of shock 120, and a second fluid port which is in fluid communication with the rebound volume shock 120. Preferably, fluid communication from these internal volumes to the external valve assembly is by way of ports in the sidewall of cylinder 126.

FIG. 3 shows a shock absorber 220 according to another embodiment of the present invention. Shock absorber 220 includes a valve assembly 270 which can electronically adjust the damping characteristics of shock 220. Valve assembly 270 includes an actuator 280 which is operably connected to a valve 272 within a housing 274. Valve housing 274 is in fluid communication with compression volume 226.4 by way of an external fluid connection 279.1 that is attached to a compression chamber port 279 that is external to cylinder 226. Similarly, valve assembly 270 is in fluid communication with rebound volume 226.5 by way of an external connection 277.1 that receives fluid from rebound chamber port 277.

Shock absorbers 120 and 220 are similar to shock 20, except that shocks 120, 220 and 320 have damping characteristics that can be adjusted electronically. Referring to FIG. 4*a*, shock 220 includes a piston 222 that divides the internal volume of cylinder 226 into a compression volume 226.4 and a rebound volume 226.5. In one embodiment, piston 222 further includes flowpaths that can fluidly interconnect the compression and rebound volumes, although the corresponding flowpaths through the piston include one-way valves 236 that permit fluid communication only at relatively high pressure differentials. Preferably, these one-way valves 236 operate as relief valves to prevent damage to shock 220 from excessively high internal fluid pressures.

Further, it is preferable that rod 224 not include an internal flow passage that provides fluid communication between the compression and rebound volumes. However, the present invention contemplates those embodiments in which rod 224 does include an internal flow passage, and further includes those embodiments in which the one-way valves 236 are operational during routine operation of shock 220. The test methods, systems, and software described later are compatible with these variations of shocks 120 and 220, although it is preferable that the flow characteristics of any fluid communication paths internal to these adjustable shock absorbers be understood and documented before interpreting any test results.

As rod 224 and piston 222 move within cylinder 226, hydraulic fluid moves into and out of valve assembly 270. As best seen in FIGS. 3 and 4, cylinder 226 includes a first port 277 which is in fluid communication with rebound volume 226.5. There is also a second port 278 which is in fluid communication with compression volume 226.4. Referring to FIG. 4*c*, during compression of shock 220, hydraulic fluid moves out of port 279, through an external connection 279.1, and into valve assembly 270. Also during compression, fluid flows from valve 270 through fluid line 277.1, through port 277, and into rebound volume 226.5. These flow directions are reversed for rebound operation, as shown in FIG. 4*b*.

Although what has been shown and described are shock absorbers 120 and 220 that are linear in operation, the present invention also contemplates application of the valve assemblies 170 and 270 for operation with rotary shock absorbers, including the toroidal damper of U.S. Pat. No. 7,048,098.

Valve assembly 270 provides an electronically adjustable means for adjusting the flow and damping characteristics of shock 220. Valve assembly 270 includes a spool valve 272 movable within a housing 274. Preferably, an LVDT 273 is attached to spool valve 272 and provides a signal corresponding to the position of the spool valve within the housing. An electromechanical actuator 280 is operably connected to reposition valve 272 so as to change the flow characteristics from the first port 276 of housing 274 to the second port 278 of housing 274. Although what has been shown and described as the use of an LVDT for a measurement of valve position, the present invention also contemplates other types of position sensors, including a Hall effect sensor.

Figure 4D:
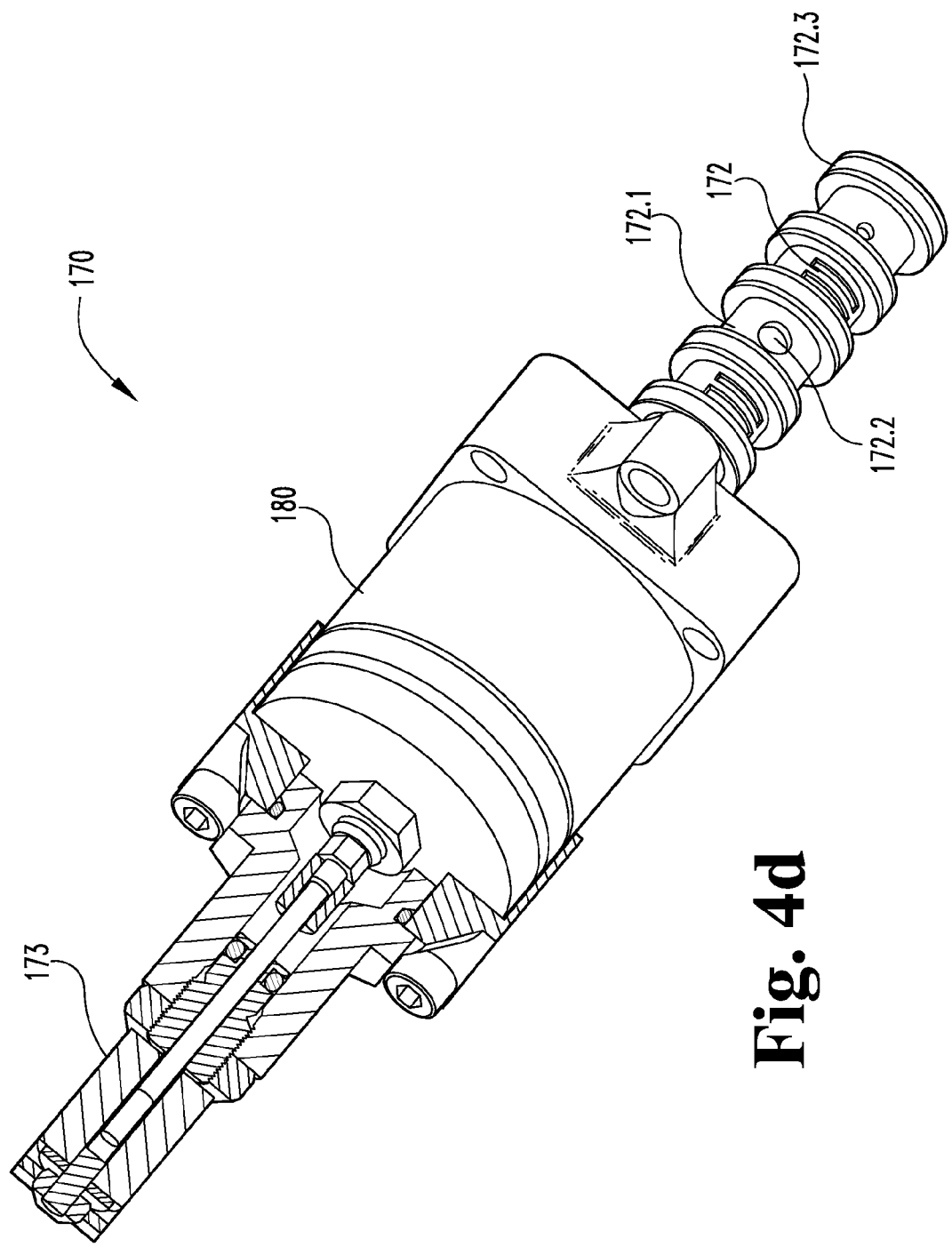
FIG. 4d is an enlargement of the valve assembly of FIG. 4a, shown partly disassembled, and partly in cutaway.
Figure 4E:
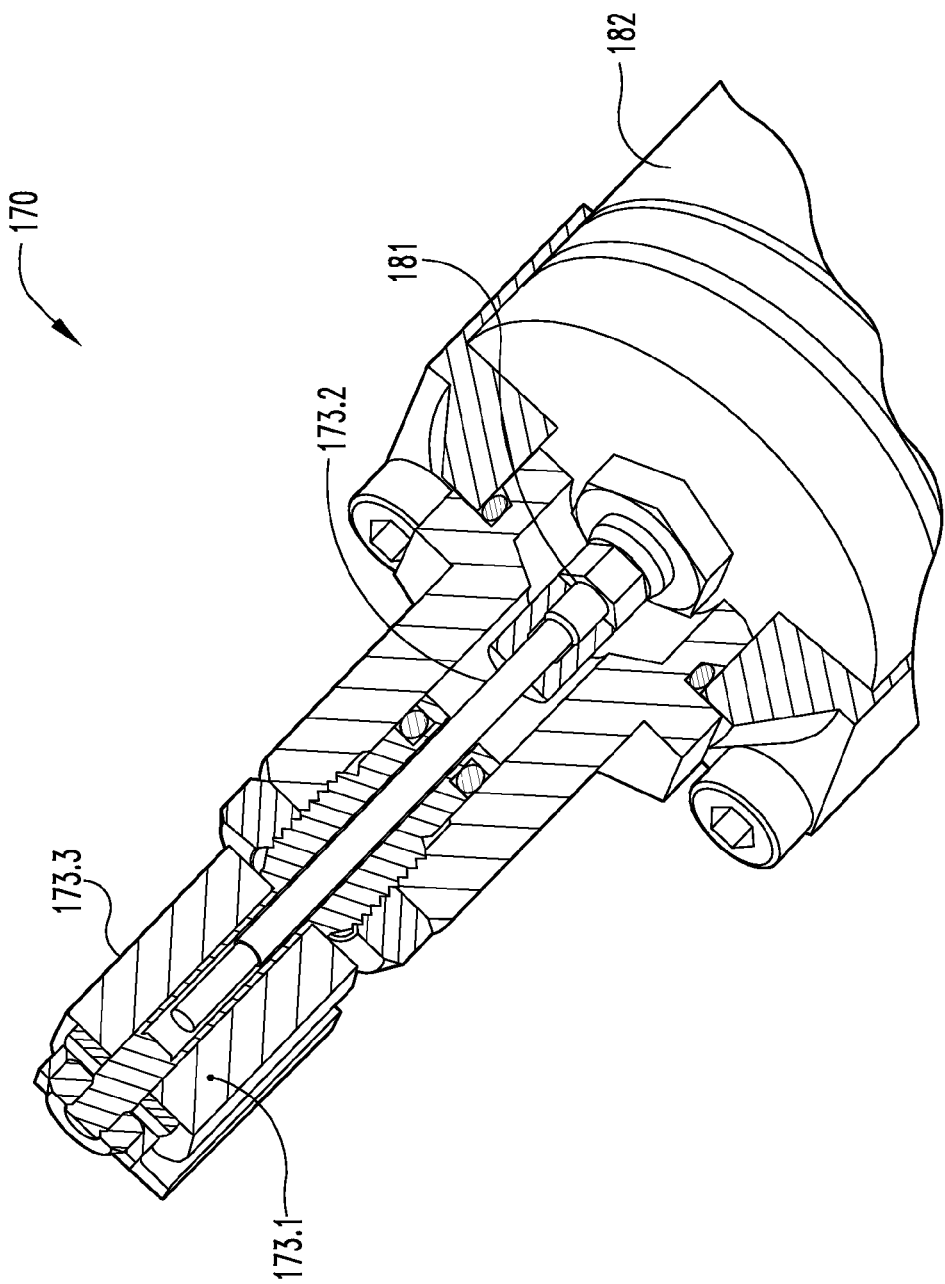
FIG. 4e is an enlargement of the drawing of FIG. 4d.

FIGS. 4*d* and 4*e* show portions of a valve assembly 170. Referring to FIG. 4*d*, valve assembly 170 is shown with housing 174 removed. Assembly 170 includes a cylindrical cartridge 172.1 that slidingly receives spool valve 172. Cartridge 172.1 is attached to the body of actuator 180. A plurality of seals 172.3 provide seals between the cartridge and housing 174. Cartridge 172.1 includes a plurality of flow ports 172.2 that are in fluid communication with corresponding actuator flow ports 176 or 178.

FIG. 4*e* is a partial cross-section view of the position sensor 173 of valve assembly 170. Position sensor 173 includes a core assembly 173.2 that moves within a plurality of coils in a coil assembly 173.1. An electrical connector 173.3 provides signals from two of the coils that depend upon the location of the core relative to the coils. Core assembly 173.2 is coupled to the spool push rod 181 of actuator 180. The other end of push rod 181 is coupled to spool valve 172. The variable magnetic field of actuator magnet 182 applies a load to push rod 181 that is counterbalanced by an internal spring (not shown). In one embodiment, actuator 180 is a direct drive permanent magnet linear force motor, such as a Moog part number E050-830. Signals from LVDT 173 are provided to an electrical interface circuit board such as a Moog part number M3000. Various embodiments to the present invention contemplate a variety of electronically controlled valves, including as one example proportional solenoids valves.

Preferably, an electronically adjustable shock absorber according to one embodiment of the present invention includes one or more sensors 250 for providing electronic data corresponding to operation of a shock absorber. As best seen on FIG. 4*a*, shock absorber 220 preferably includes one or more pressure transducers 254 for measurement of pressure in one or both of the compression volume or rebound volume. Further, shock absorber 220 preferably includes a velocity sensor 256 for measuring the velocity of rod 224 relative to cylinder 226, such as a linear velocity transducer (LVT). In other embodiments, shock 220 includes a position sensor 258 for measuring the position of rod 224 relative to cylinder 226, such as a linear variable displacement transducer (LVDT). Additionally, shock absorber 220 can be instrumented to include a load sensor 252, such as a strain gauge, for measuring the load transmitted by rod 224.

Figure 12:
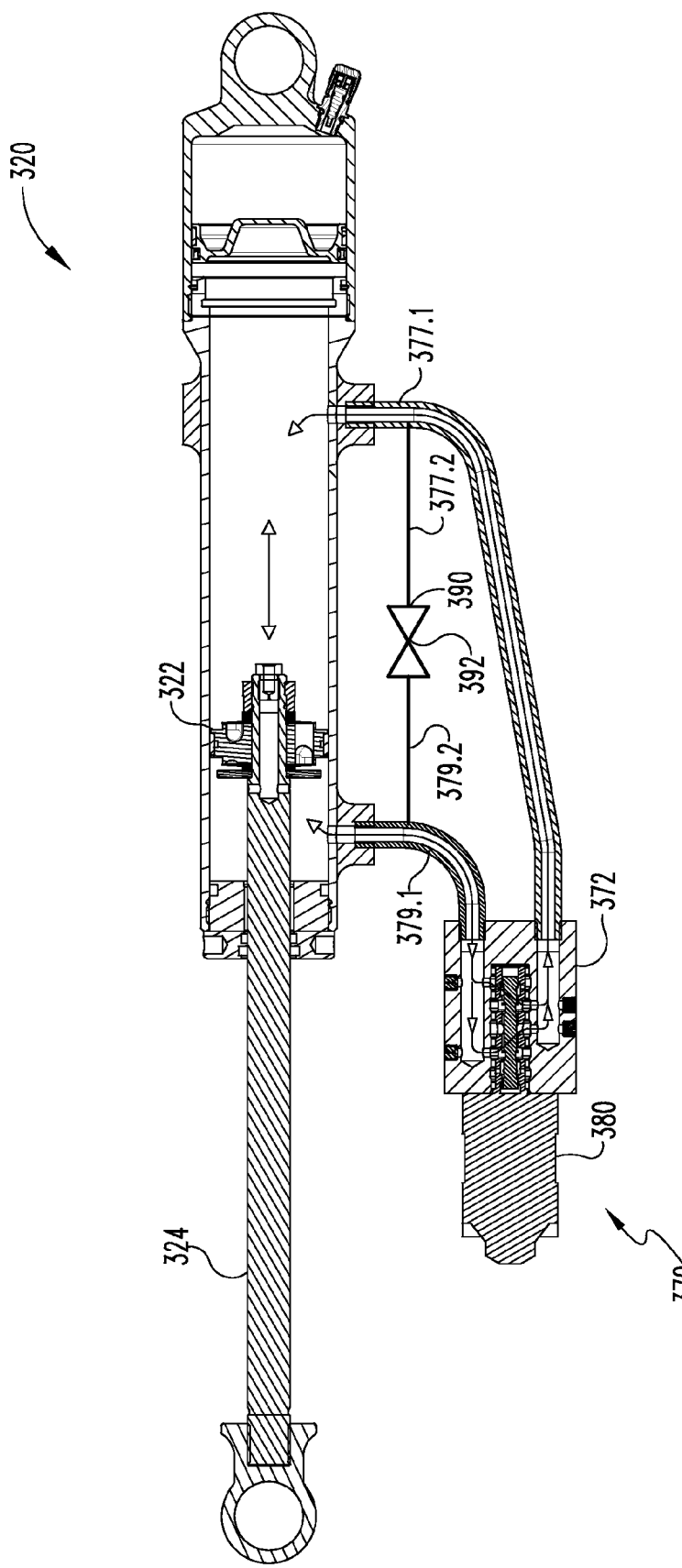
FIG. 12 is a cutaway view of a shock absorber according to another embodiment of the present invention.

FIG. 12 shows shock absorber 320 according to another embodiment of the present invention. Shock absorber 320 is similar to shock absorber 220 except that it also includes an externally adjustable bypass valve 390 that is in parallel with electronically controllable valve assembly 370. In one embodiment, bypass valve 390 includes an external adjuster 392 that is operatively connected to a variable restriction, such as a needle valve that can be placed at different locations within an orifice. By adjusting the position of the needle valve within the orifice, a fixed restriction is achieved for that particular placement of the needle valve. Valve 390 is in parallel fluid communication with valve 370 by external connections 377.2 and 379.2. In one embodiment, valve 390 can be adjusted to a fully closed position. When so adjusted, all of the fluid bypassing the piston 322 flows through the electronically controlled valve 370. When valve 390 is externally opened to permit flow therethrough, since the flow through valve 390 is not electronically controlled, the flow through valve 390 is from a higher pressure to a lower pressure through a fixed orifice. In this partially opened state, it is possible to have a higher total flow bypassing piston 322 and thereby extend the hydraulic upper limit of piston-bypassing flow.

Figure 5:
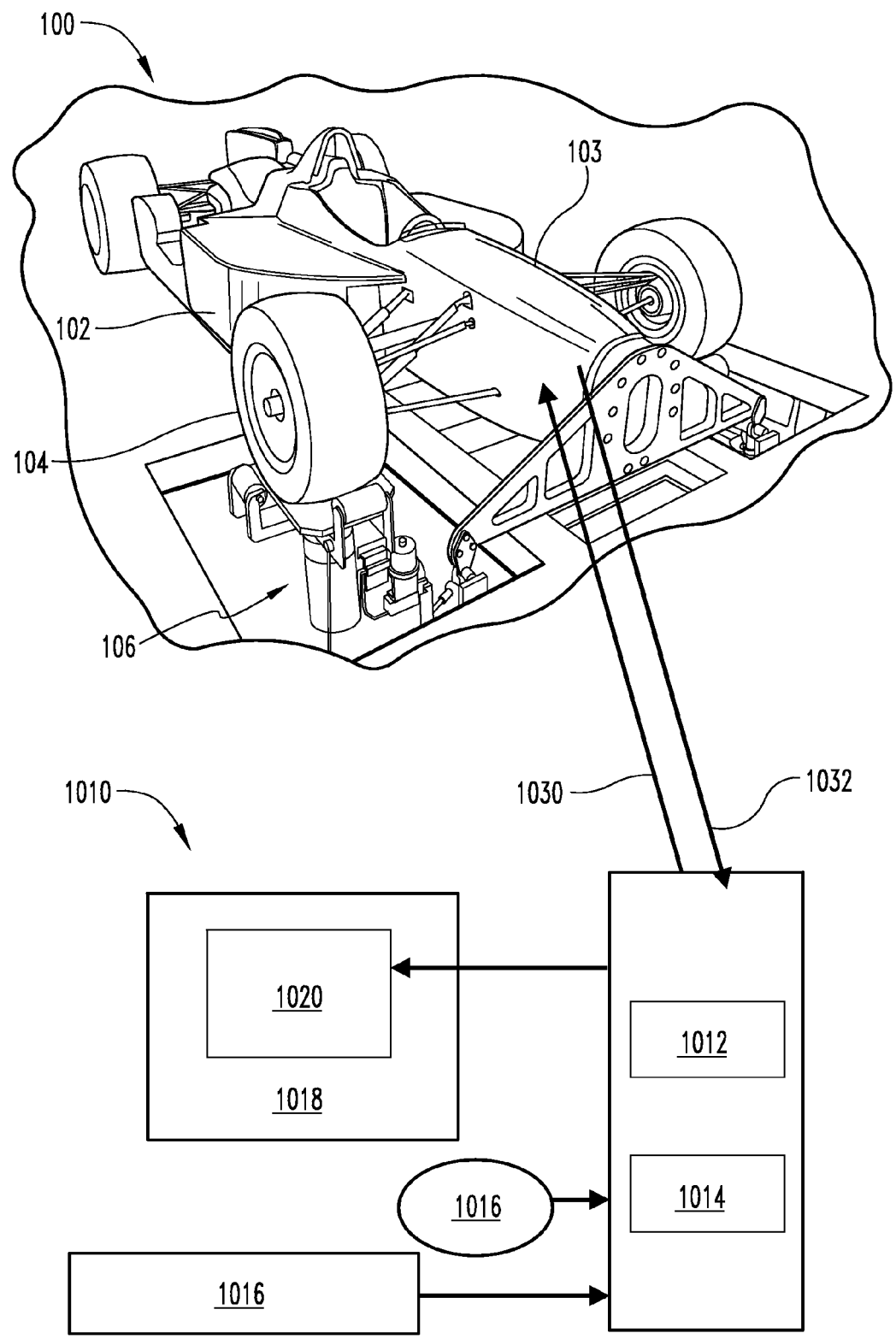
FIG. 5 is a schematic representation of a system for testing a vehicle suspension according to one embodiment of the present invention.

FIG. 5 is a schematic representation of a system 100 for testing the suspension of a vehicle. System 100 includes a vehicle 102 suspended from a plurality of wheels 104. Preferably, each wheel 104 includes a tire which is in contact with an actuator 106. Actuator 106 applies a force to the tire which is transmitted to the frame of the vehicle through the spring 105 and shock absorber of the suspension for that wheel. The suspension of a wheel typically includes one or more rigid arms which describe the motion of the wheel relative to the vehicle, one or more springs 105 which bias the vehicle relative to the wheel, and a shock absorber which damps the relative motion between the wheel and the vehicle. Motion of the frame of the vehicle 102 is sensed by one or more position sensors 103, such as one or more accelerometers, velocity transducers, or position transducers, which can be oriented for measurements describing motion in the x, y, z, roll, pitch, or yaw directions.

Preferably, testing system 100 includes one or more shock absorbers 120 or 220. In some embodiments piston system includes an electronically adjustable shock absorber such as shock 120 or shock 220 at each wheel of the vehicle. However, the present invention also contemplates those embodiments in which testing is performed with electronically adjustable shock absorbers on fewer than all of the wheels. In yet other embodiments, testing system 100 includes the use of electronically adjustable shock absorbers having actuated electrohydraulic mechanisms contained at least partly within the cylinder.

As depicted schematically in FIG. 5, testing system 100 includes a computer system 1010 which is operably connected to shock absorbers 220 and sensors 103. Computer system 1010 includes a processor 1012 capable of receiving data from data channels 1032, and also capable of providing commands by way of command channels 1030 to the actuators 280.

In the various testing systems and testing methods disclosed and claimed herein, the terms computer, computer controller, electronic controller, or controller refer to the overall computer system and electronics that interface the user to the electronically adjustable shock absorber. These terms refer to the overall system, which can include a variety of supporting components, such as displays, user interface devices, power supplies, A/D and D/A converters, various storage media (including permanent, temporary, flash, portable, and other varieties of memory) and various control functions (including filter controls, A/D and D/A controllers). However, these terms do not include the detailed driving software or detailed driving hardware required to operate the Moog embodiment of actuator 180, nor do they include the Moog electrical interface circuit board that interfaces with LVDT 173, unless otherwise specified. Any claimed reference to the Moog electrical interface circuit board will be referred to as a spool valve LVDT interface circuit. Any reference to Moog embodiment of actuator 180 will be referred to as a spool valve permanent magnet linear force motor.

Computer system 1010 further includes one or more types of memory 1014 (including but not limited to RAM, ROM, a flash drive, CD, DVD, floppy disk, hard drive, etc.) which contain a stored algorithm 1034 for operation of shock absorbers 220. System 1010 further includes a display 1018 which displays data from and transmits commands to processor 1012. One or more user interface selection devices 1016 such as a keyboard or mouse provide for inputs from the operator to the computer system 1010.

Figure 6:
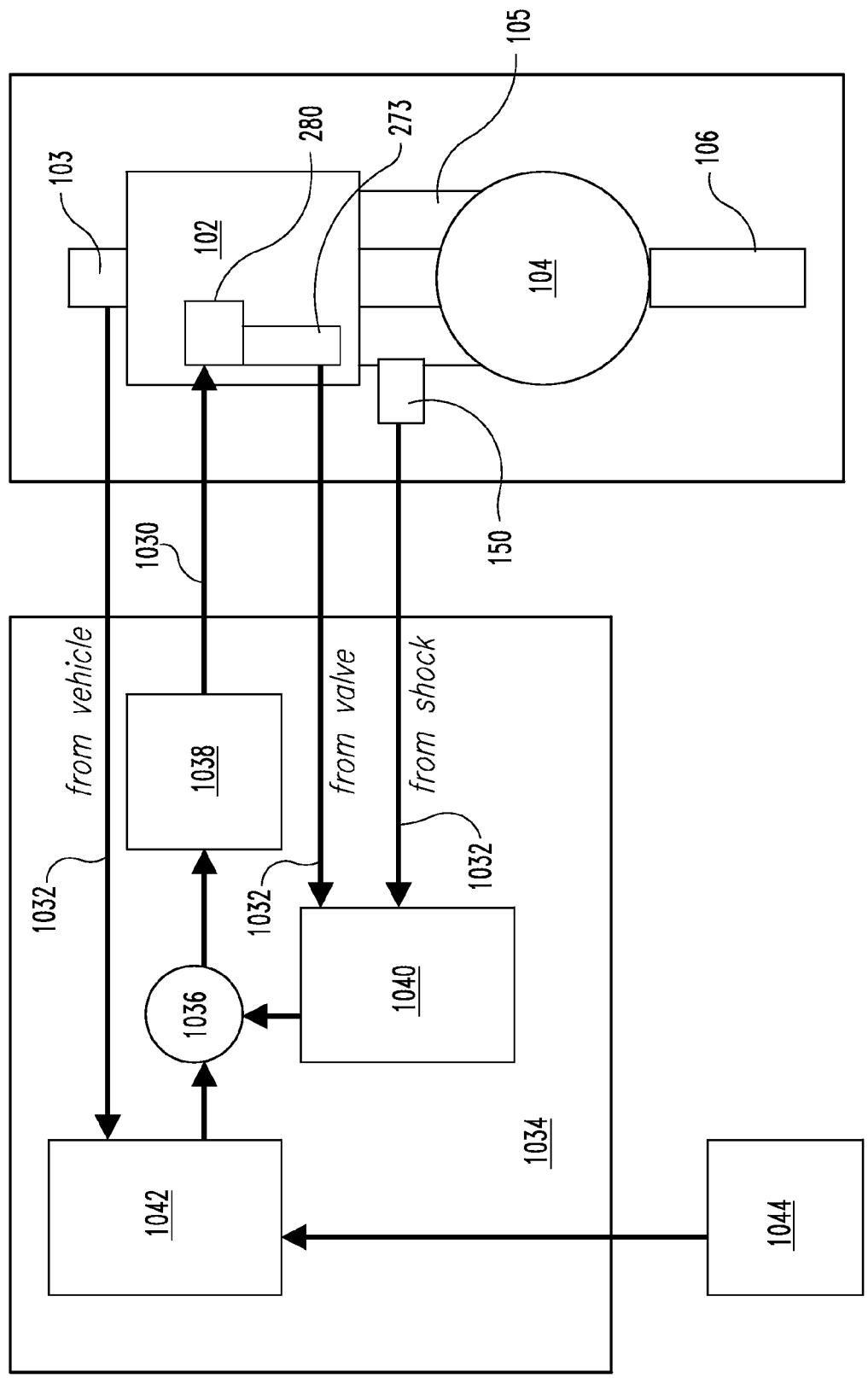
FIG. 6 is a partial block diagram of a control algorithm according to another embodiment of the present invention.

FIG. 6 is a schematic representation of a control system according to one embodiment of the present invention. FIG. 6 shows a control software algorithm 1034 that operates through processor 1012 and the appropriate I/O circuitry to drive actuators 280 and to receive and interpret the various data.

Algorithm 1034 uses an input damping data structure 1044 provided by the user to control and monitor the damping characteristics of shock absorber 220. In one embodiment of the present invention, the damping data structure 1044 is created by a first software algorithm for modeling the damping characteristics of a shock absorber, and control algorithm 1034 represents one embodiment of a second algorithm for controlling the damping of a shock absorber generally in accordance with the first software algorithm. Algorithm 1034 converts the damping data structure into the desired corresponding damping characteristics 1042 of an electrically adjustable shock absorber. In one embodiment, the damping data structure relates the position of valve (such as valve 172 or 272) to the stroking velocity of the shock absorber (for example, as measured by velocity sensor 156, 256, or 356). As yet another example, damping data structure 1044 can relate the desired damping of the shock absorber in other terms (such as damper force as a function of stroking velocity) which can be converted into terms of velocity and position.

Further, the damping data structure can include multiple relationships of damper force as a function of stroking velocity, these tables being further differentiated by the relative position of one end of the shock absorber versus the other end of the shock absorber, or the acceleration of one end of the shock absorber relative to the other end of the shock absorber. In addition, these various data tables can be further differentiated to take into account variables including ambient temperature and shock absorber wear. In these cases, the tables can be altered to simulate a shock absorber operating at low ambient temperature, moderate ambient temperature, or high ambient temperature. In addition, the tables can be further differentiated to take into account the wear of the moving parts of the shock absorber (such as the seals), as would be experienced over a long endurance race. Damping data structure 1044 can further include relationships of damper force to stroking velocity that further depend upon shock absorbers spatial values such as relative stroking position, relative stroking acceleration, and simulations directed to shock absorber temperature and shock absorber wear.

Preferably, software block 1042 would converts this input data structure to a corresponding position of a valve (by way of example, valve 172) within a valve housing (by way of example, valve housing 174). The software block 1042 identifies the proper position of the electronically adjustable valve, which is compared to the actual position of the valve at summing junction 1036. Summing junction produces an error signal that is appropriately modified by control filtering 1038 in terms of amplitude and frequency to generate command signals 1030 that are sent to the appropriate actuator of the electronically adjustable shock absorber (by way of example, to actuator 280 of shock absorber 220).

As these command signals are converted by the actuator into a valve position, the damping characteristics of the corresponding electronically adjustable shock absorber are changed. The actual damping characteristics of the shock absorber are measured by one or more corresponding shock absorber sensors 150, such as a pressure sensor 154, velocity sensor 156, position sensor 158, or load sensor 152. A signal from the sensor is returned to a feedback processing filter 1040 which provides the appropriate filtering to the signals in terms of frequency and amplitude. The corresponding output signal, representative of the actual measured damping, is then sent to summing junction 1036 for comparison to the desired damping characteristic. Shock absorber sensors 150 can be of any type, including strain gage diaphragm pressure transducers, piezoelectric pressure transducers, linear velocity transducers, radio frequency probes, Bentley Nevada proximately probes, linear variable displacement transducers, Hall effect transducers at accelerometers, and the like.

In one embodiment, a velocity sensor 156, such as a linear velocity transducer, is used. This signal can be integrated to calculate a stroking displacement, and can be differentiated to calculate a stroking acceleration. In performing these integration and differentiation calculations, the controlling software can include adaptive filters. These filters have break frequencies that are functions of the currently measured velocity or acceleration.

Figure 13:
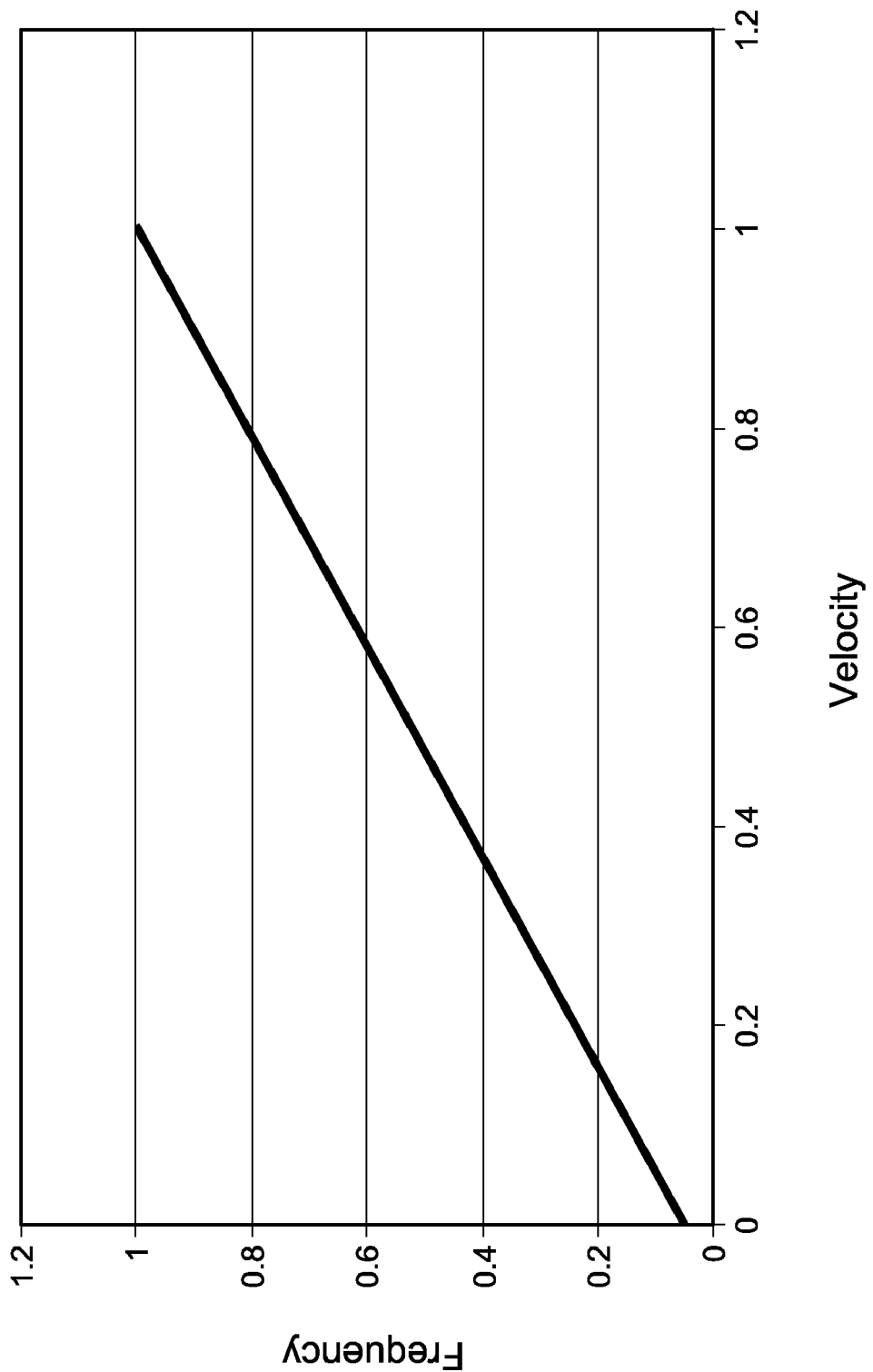
FIG. 13. is a graphical relationship according to one embodiment of the present invention.
Figure 14:
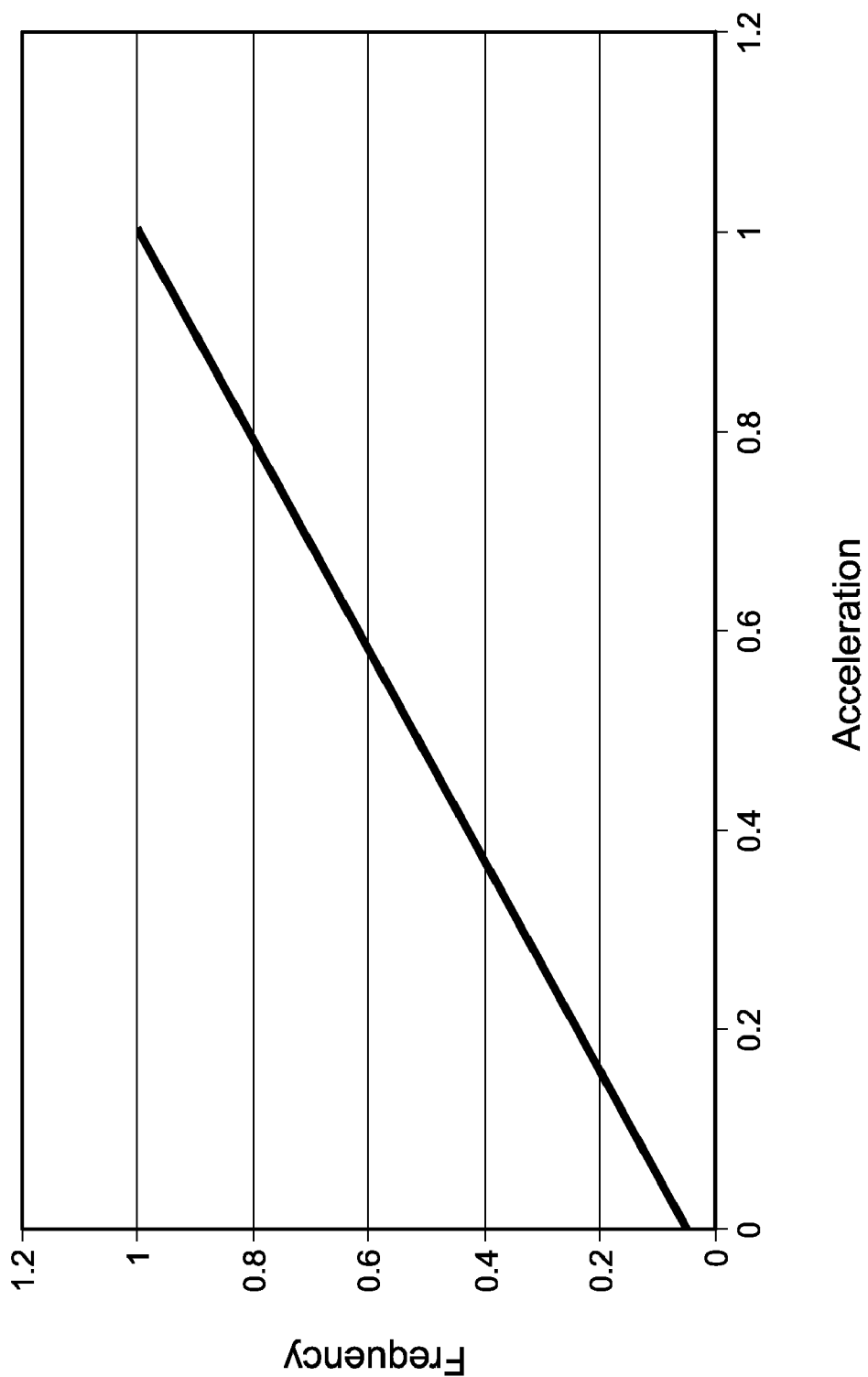
FIG. 14 is a graphical relationship according to one embodiment of the present invention.

FIGS. 13-14 are graphical representations of one embodiment of the present invention which includes such adaptive filters. In this embodiment, the break frequency of the velocity filter is adjusted as a function of the calculated acceleration. Further, the break frequency of the acceleration filter is varied as a function of the calculated velocity. FIG. 13 graphically shows a straight light relationship between a break frequency for an acceleration filter that varies according to the current stroking velocity of the damper. At 0 velocity, there is a minimum break frequency. As the measured velocity increases, the break frequency of the acceleration filter increases. Although a linear increase is shown, the present invention also contemplates nonlinear relationships that include the selected break frequency generally increasing as a function of stroking velocity. Further, it is understood that although this graph is entered with a velocity term, it is also possible to enter this graph with a change in stroking position, such as the difference between the current stroking position and the previous stroking position.

FIG. 14 graphically shows a straight light relationship between a break frequency for a velocity filter that varies according to the current stroking acceleration of the damper. At 0 acceleration, there is a minimum break frequency. As the measured acceleration increases, the break frequency of the velocity filter increases. Although a linear increase is shown, the present invention also contemplates nonlinear relationships that include the selected break frequency generally increasing as a function of stroking acceleration. Further, it is understood that although this graph is entered with an acceleration term, it is also possible to enter this graph with a change in stroking velocity, such as the difference between the current stroking velocity and the previous stroking velocity.

In one embodiment, the control algorithm further includes a calculation for an acceleration/deceleration flag. The value of acceleration multiplied by velocity provides either a positive result or negative result, this result then setting an acceleration flag. The algorithm further includes two tables for converting a velocity input to a force output. One table provides a look-up table for use when the acceleration flag is positive; another table provides a look-up table for force values when the flag is negative. The acceleration/deceleration flag is used in selection logic to establish which force value to use. Note that in some embodiments, the output of the table are force values; in yet other embodiments, these outputs are valve positions. The output tables are ultimately a position, and the position value is converted to a valve driving signal.

In some embodiments, the electronically controlled shock absorber further includes an on/off switch that is toggled at a particular stroking displacement. As the shock absorber moves past that particular displacement and toggles this switch, the software can relate that location to the currently calculated position being integrated from the measured velocity.

In yet another embodiment of the present invention the damping characteristics of the shock absorber (120, 220, or 320) are adjusted based on the acceleration of the rod (124, 224, or 324) relative to the cylinder (126, 226, or 326). The relative acceleration of the shock absorber is measured, and damping characteristics are chosen in accordance with the sign and/or magnitude of the acceleration, or in accordance with the sign and/or magnitude of the product of velocity and acceleration. As one example, an LVT (156, 256, or 356) has one portion (such as a pole piece) attached to one of the rod or cylinder, with the other portion of the LVT (such as the windings) attached to the other of the rod or piston. In this configuration, the signal of the LVT corresponds to the velocity of the rod relative to the cylinder. That signal can be differentiated to provide a calculated acceleration of the rod relative to the cylinder.

In addition to using the sign or magnitude of the acceleration to select a particular damping table, this relative acceleration, or stroking acceleration, can also be used to establish an incremental portion of the total damping characteristic that is proportional to the stroking acceleration. This portion of the desired damping characteristic is used to represent the hysteresis characteristics of the damper. By including a desired damping characteristic related to stroking acceleration, it is possible to have the electronically controlled damper (120, 220, or 320) more closely replicate the hysteresis that can be present in some hydraulic dampers (i.e., the damper that is constructed to achieve the desirable damping characteristics as determined during the test session).

The hysteresis characteristics of a damper can relate to mechanical tolerance-related aspects (such as shifting of seals and mechanical looseness) as well as hydromechanical stiffness (fluid compressibility and cylinder expansion). As one example, as the rod and cylinder accelerate toward each other, these hysteresis-related forces build up. When the stroking acceleration changes sign (i.e., decelerates), even when the sign of the stroking velocity has not changed, these built up forces are released, with the result that the force exerted by the damper is higher.

Yet another embodiment of the present invention, characteristics of the electronically controlled shock absorber are adjusted based on both velocity and displacement. As one example, a software table 1044 or 1104 include a force versus velocity relationship in which there is reduced damping when there is a change in sign of velocity. This reduced damping is in effect for a predetermined portion of relative displacement after the sign change, and thereafter revert to a second, higher damping characteristic after that portion of stroke has been accomplished. Such a control method provides a predetermined amount of looseness in the damper characteristics over a predetermined increment of displacement. This degree of looseness can assist in reducing the damping forces imparted to the chassis when the tire goes over relatively small bumps in the roadway. In one embodiment, this predetermined amount of looseness is established by a displacement counter within the controlling software. After there is a change in sign in velocity, the displacement is counter established at zero, and thereafter begins measuring the amount of travel after the velocity sign change. During this period of predetermined looseness, a first, lower value of damping is established. When the displacement counter reaches its predetermined limit, a second higher level of damping is established.

Control algorithm 1034 receives as an input a damping data structure 1044 provided by the user. Preferably, data structure 1044 can be in any terms familiar to the user. In one embodiment, data structure 1044 is created through a first software algorithm that is adapted and configured for expedient and straight-forward creation of the data structure by a user, such as a test engineer. For example, the user can provide damping in terms of force as a function of the relative velocity and relative displacement of the shock absorber rod relative to the shock absorber cylinder. Further, the damping data structure can be provided as functional relationships, such as from a multivariable polynomial equation. The damping data structure 1044 can also be constructed and chosen from a software-driven menu 1050 presented as a graphical user interface 1020 on display 1018.

Figure 7:
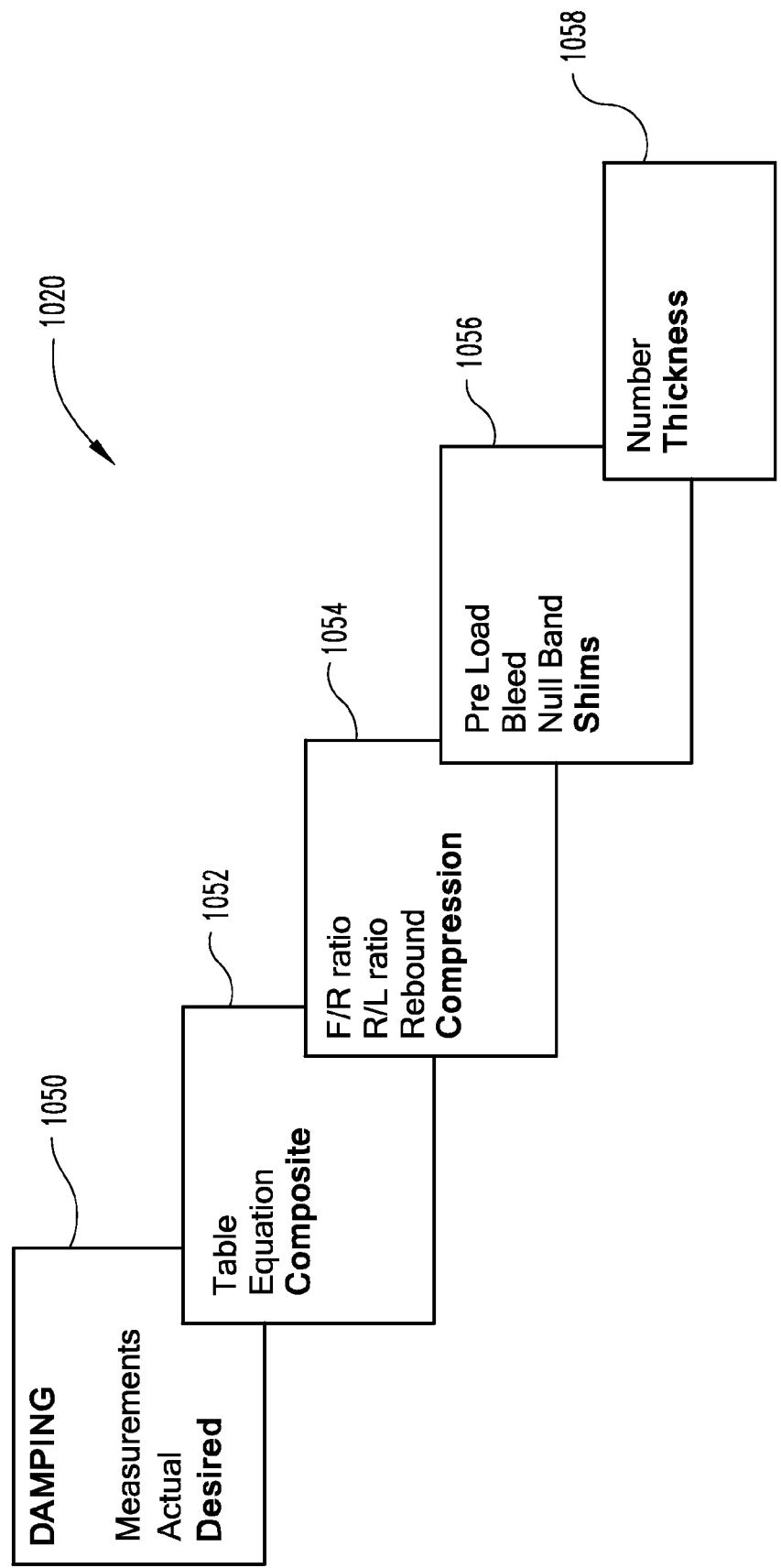
FIG. 7 is a depiction of a graphical user interface according to another embodiment of the present invention.

In one embodiment as shown in FIG. 7, GUI 1020 shown on display 1018 includes a user-selected damping menu 1050. Menu 1050 includes a plurality of user-selectable entries, including the measurements from the shock absorber sensors, the actual damping of the shock absorbers based on the measurements, and the desired damping characteristics to be evaluated. Selection of the option for desired damping results in another submenu 1052 which permits the user to chose the format for the input data, such as from a table, an equation, or as a composite to be constructed from a compilation of selected damping elements.

In one embodiment, selection of the composite entry from submenu 1052 results in a submenu 1054 which provides the user with options for establishing the damping data structure for rebound or compression. Further, the operator is provided options for selecting a fixed relationship from the front to rear shocks, and for four wheeled vehicles, the relationship from right to left. In one embodiment of the present invention, the F/R ratio can be a fixed ratio of front and rear damping forces for the same relative velocity and relative displacement. In yet other embodiments, this F/R ratio is not be a single, fixed number, but can also vary as a function of relative velocity or relative displacement. This submenu entry can be useful for initial setup of new suspension designs without a significant road or track history, and where vehicle acceleration can result in significant fore and aft weight shifting.

As one example, a selection of the R/L ratio can be a fixed ratio of right and left damping forces for the same relative velocity and relative displacement. Additionally, this R/L ratio need not be a single, fixed number, but can also vary as a function of relative velocity or relative displacement. This submenu entry can be useful for initial setup of new suspension designs without a significant road or track history, and where the vehicle operates on an oval course.

Figure 8A:
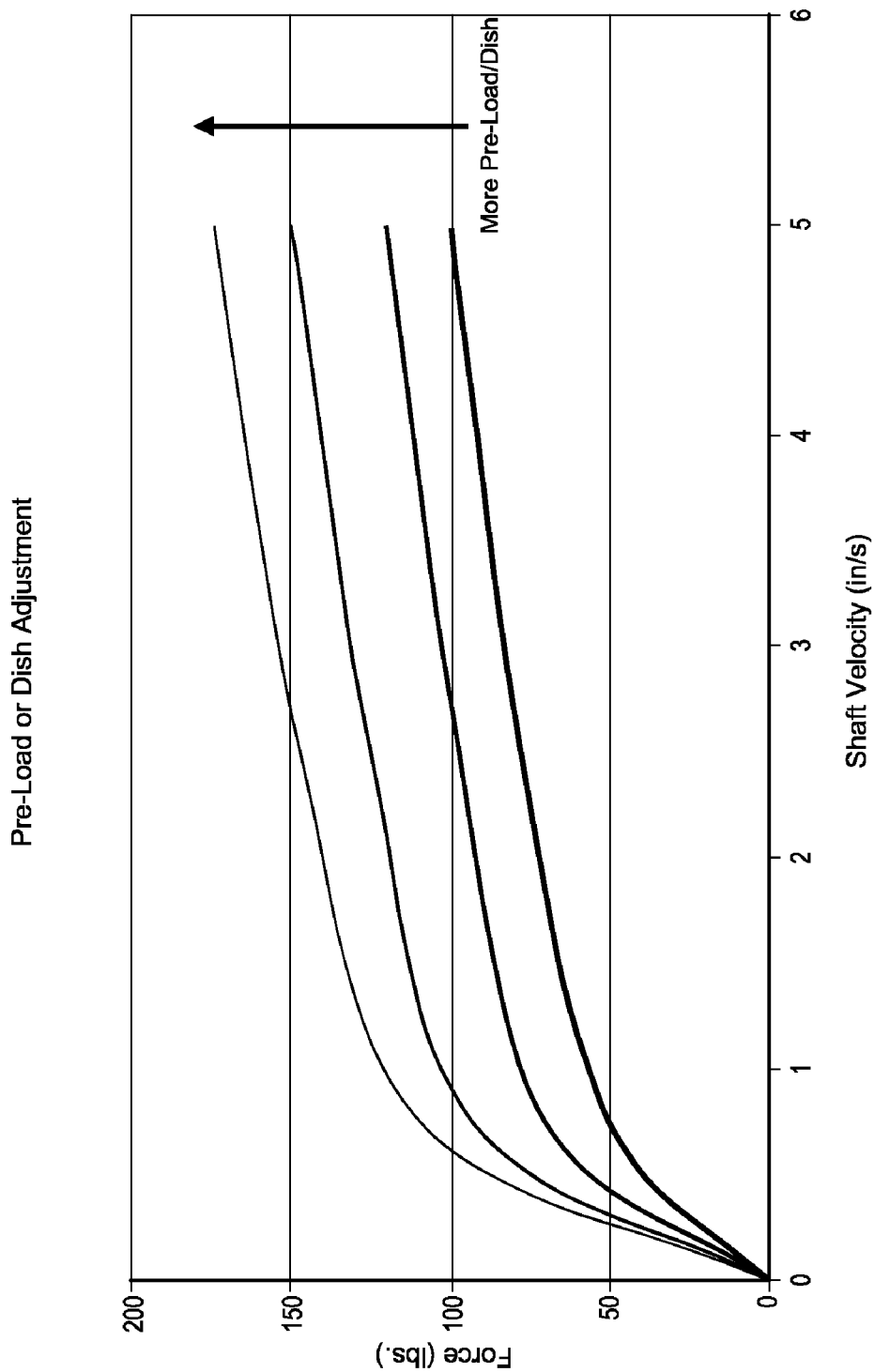
FIG. 8a is a graphical depiction of a selected menu entry from the GUI of FIG. 7.
Figure 8B:
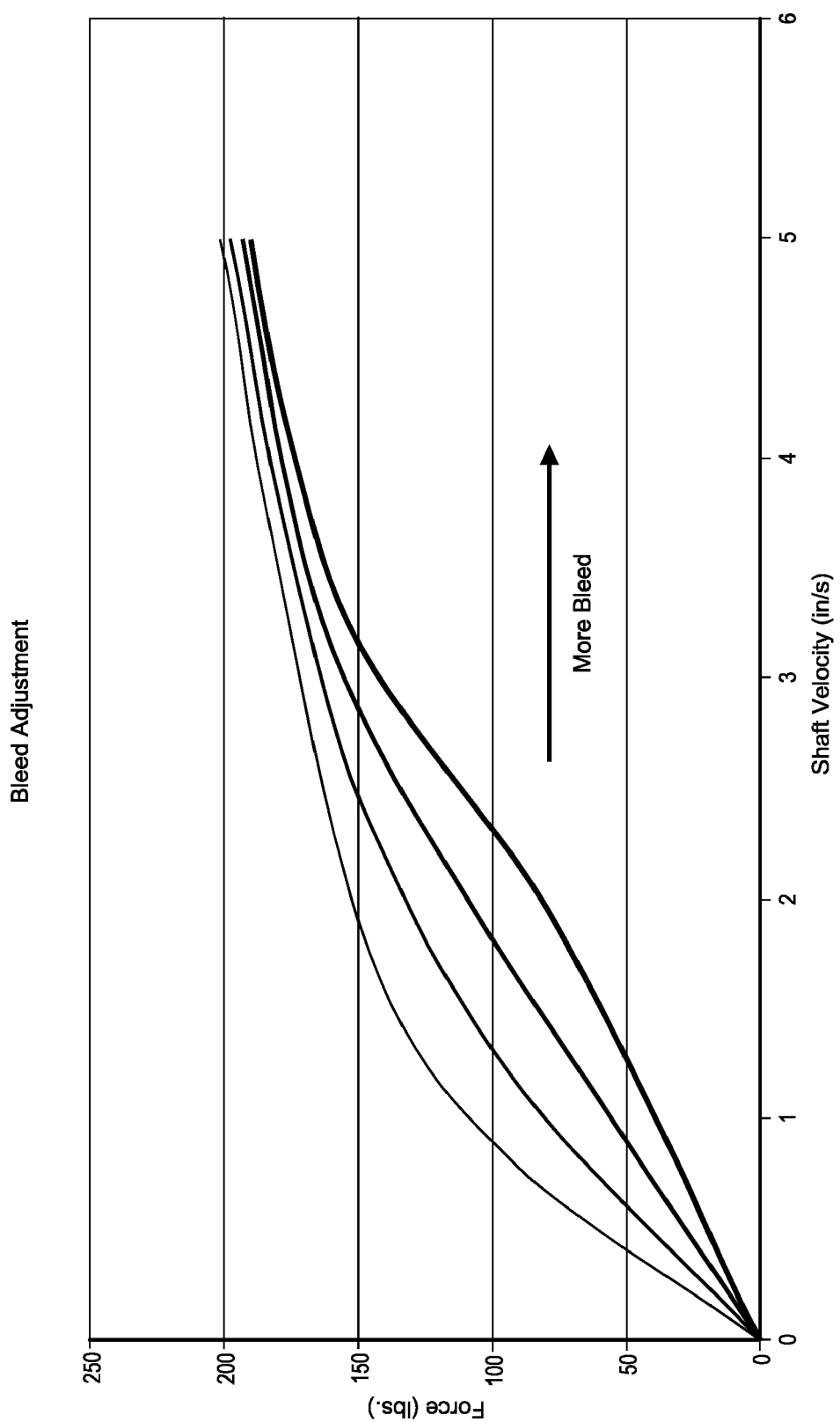
FIG. 8b is a graphical depiction of another selected menu entry from the GUI of FIG. 7.

Selection of either the rebound or compression options for submenu 1054 provides a submenu 1056 which provides a plurality of suboptions that correspond to damping elements. In one embodiment of the present invention, submenu 1056 includes a plurality of shock absorber elements with different flow and load characteristics. Submenu 1056 includes an entry for a preload to be applied to one or more shims on a one-way valve such as one-way valve 36. FIG. 8a shows four members of a family of preload or dishing elements, with the resultant damping force being the function of the amount of preload and the shaft velocity. Yet another entry in submenu 1056 correspond to the bleed characteristics in an internal flow passage, such as the bleed within internal passage 24.1 which flows past a metering needle 24.3. FIG. 8b shows four members of a bleed adjustment family, and relates damping force to shaft velocity.

Figure 8C:
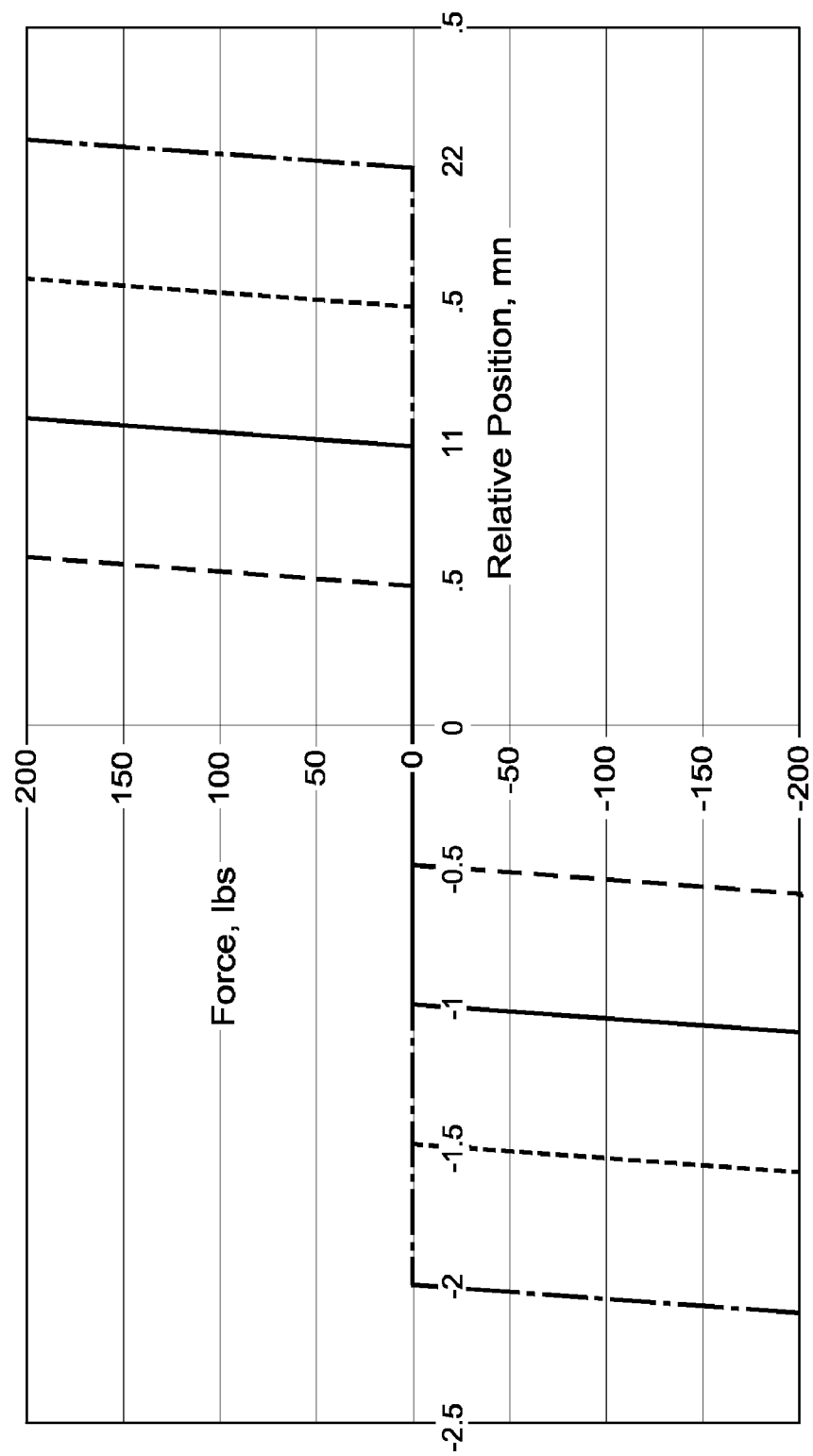
FIG. 8c is a graphical depiction of another selected menu entry from the GUI of FIG. 7.

Yet another entry in submenu 1056 pertains to a null band of operation for the shock absorber. Referring to FIG. 8c, there are four members of a family where the damping force is shown as a result of the relative position of the shaft and the positional history. FIG. 8c indicates that the damping forces are negligible for the initial movement of the shaft from any given starting position.

Figure 8D:
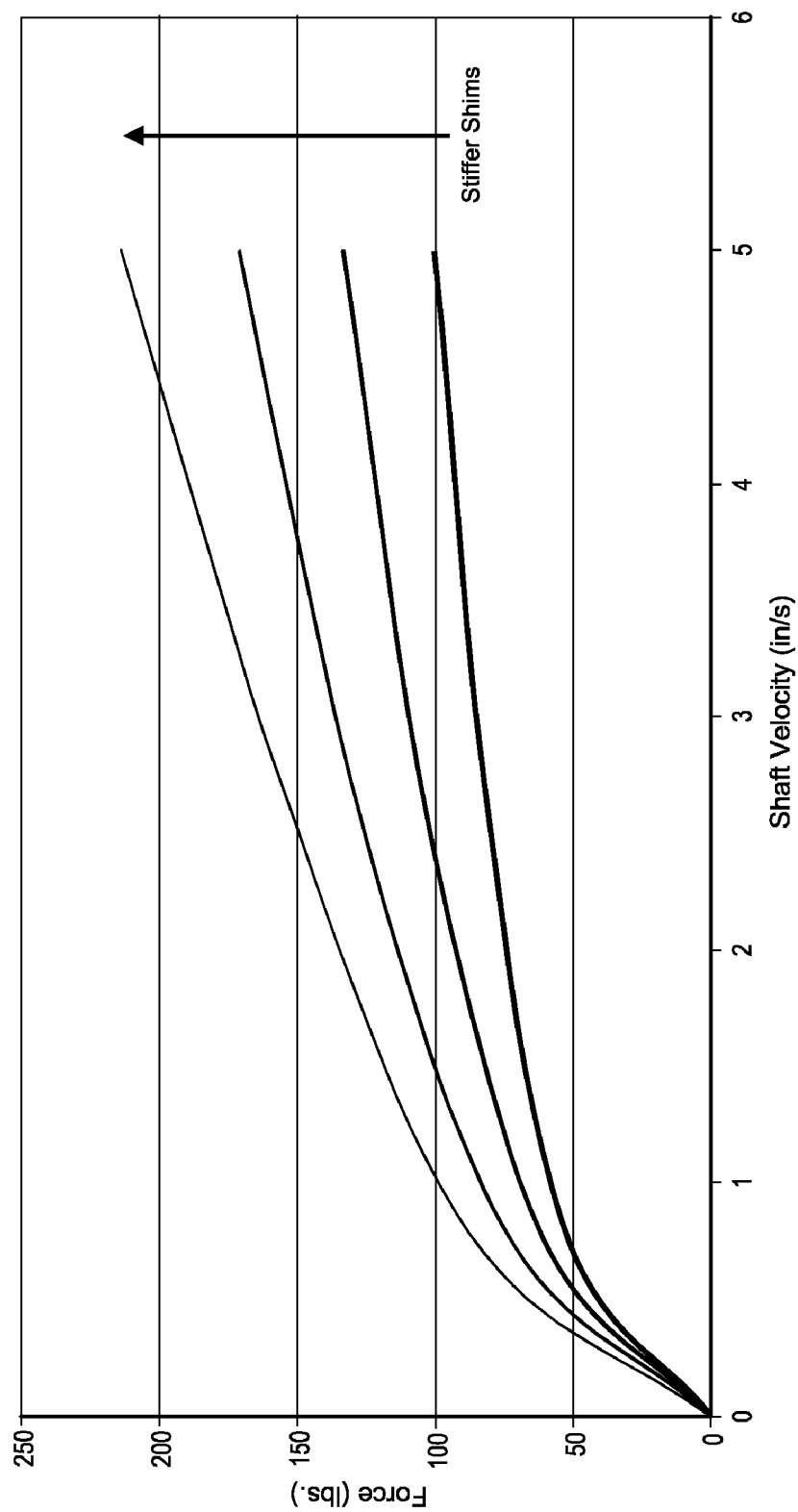
FIG. 8d is a graphical depiction of another selected menu entry from the GUI of FIG. 7.

Yet another entry in submenu 1056 pertains to the number or stiffness of shims in a corresponding one-way valve 36. Referring to FIG. 8d, there is a family of flow characteristics that relate the stiffness of the shims to the force of the shock absorber as a function of shaft velocity.

Yet another embodiment of the present invention pertains to a method for optimizing the performance of a vehicle relative to a damping characteristic. As one example, the test method includes the testing of a vehicle suspension, and preferably an entire vehicle, on a test rig such as a 4 post, 6 post, or 7 post rig, as examples. At least one tire of the vehicle has a pressure distribution measuring sensor between the tire and the corresponding rig actuator. As that actuator excites the corresponding tire, a measurement is made of this history of the tire contact pressure at a particular operating condition. From a plurality of such pressure measurements a quantitative assessment of vehicle response, such as a grip number, can be established.

The method includes establishing a plurality of vehicular response assessments, such as a plurality of grip number, each corresponding to the usage of a different damping characteristic and thereby different simulated shock absorber. In some cases this family of different simulated shock absorbers is varied one dimensionally. Some examples of this one dimensional variation technique include: varying the number of piston shims in the compositely modeled shock; varying the coefficients in a functionally modeled shock, and incrementing or multiplying the force entries in a tabularly-represented shock. In some embodiments, these one-dimensional sweeps are performed automatically by an optimization software loop the operates over the first software algorithm (which is instructed to prepare a revised set of damping characteristics upon request) and the second software algorithm (which is instructed to test the set of damping characteristics). The optimization loop calculates the vehicular quantitative assessment (such as the grip number) for each of the iterations, and determines a damping characteristic that optimized the assessment quantity.

In some embodiments, after the assessment is performed for the first variable (for example, number of piston shims), a second assessment can be performed using the selected, optimized setting (i.e., the optimal number of shims), and varying a second dimension (such as the flow number for a fixed bleed interconnected the rebound and compression volumes of a shock). In this manner a plurality of one-dimension optimizations are accomplished, each for a different design variable. further, the method contemplates multidimensional searches in which the first optimized variable (such as no. of shims) is rechecked after the second optimized variable (the flow number) has been selected, in order to determine if the selection of the second variable requires the selection of a different first variable. The algorithm further includes convergence criteria to determine if the overall system (the vehicle) and the test method is well-behaved. Appropriate limits are also established for the design parameters (for example, the maximum no. of shims; the maximum size of the fixed bleed; the minimum size of the fixed bleed; and the like).

Figure 11:
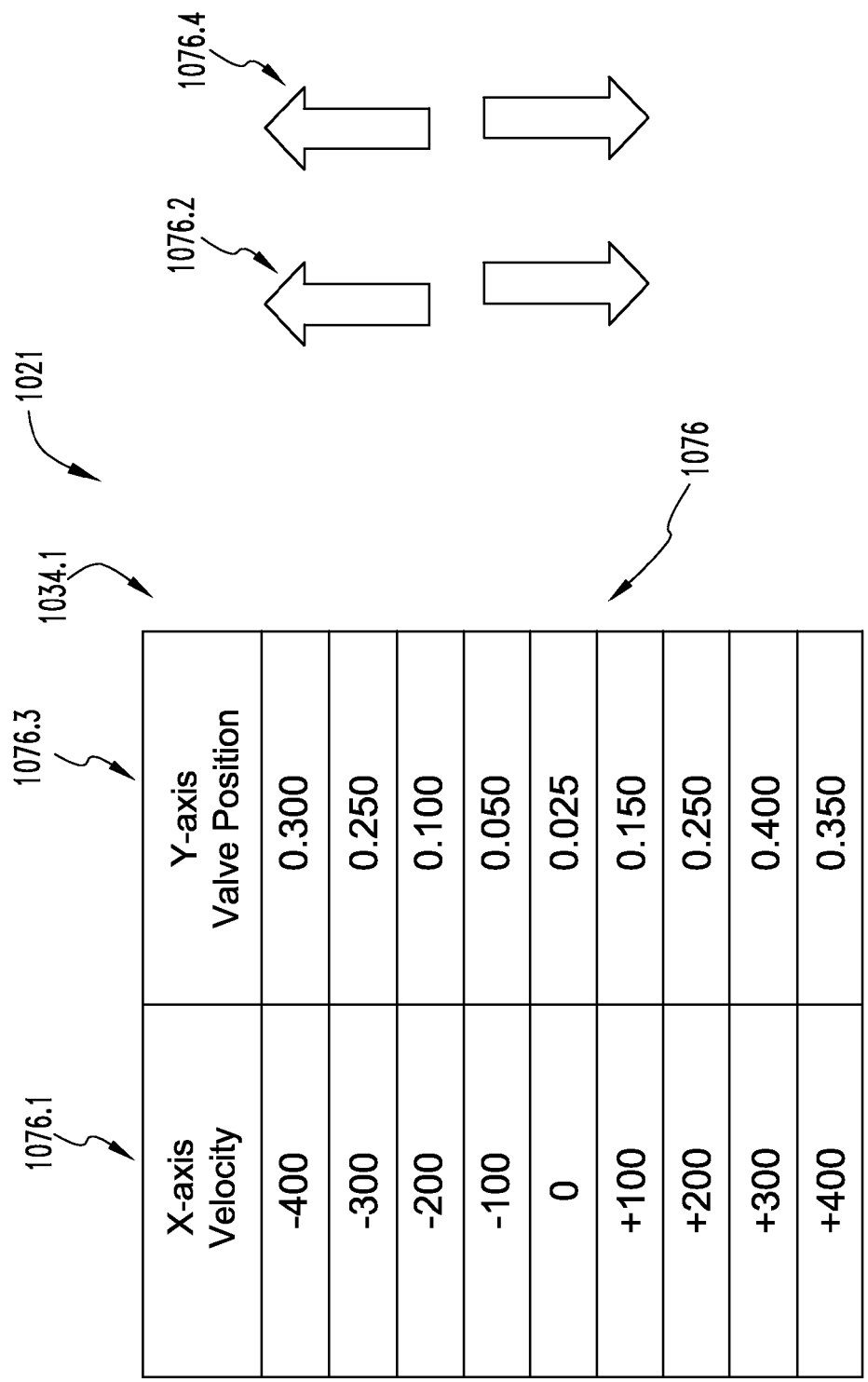
FIG. 11 is a depiction of a graphical user interface according to another embodiment of the present invention.

FIG. 11 depicts another graphic user interface 1021 according to another embodiment of the present invention. FIG. 11 includes a pictorial representation of a look-up table 1076 on GUI 1021. Table 1076 includes a plurality of ordered pairs of data relating a characteristic of the shock absorber in column 1076.1 to a corresponding dampening characteristic of the shock absorber in column 1076.3. As one example, column 1076.1 includes data bins corresponding to brackets of piston velocity (such as that derived from a position sensor 158 or 258 or measured from a velocity sensor 156 or 256). Preferably, the velocity data spans a range from rebound to compression. Other embodiments of the present invention include shock absorber positional data or data pertaining to the position, velocity, or acceleration of the vehicle frame among any of the six degrees of rigid body motion.

Column 1076.3 includes the other member of the ordered pairs of data. As one example, column 1076.3 includes data pertaining to the desired position of a valve (such as the position measured by sensor 176 or 276), which itself corresponds to a pressure drop across a piston and a corresponding damping force. The present invention also contemplates those embodiments in which the damping characteristic is pressure drop or shock absorber force, as examples.

In one embodiment, GUI 1021 includes a pair of up and down increment buttons 1076.2 for changing a selected velocity value, and a pair of up and down increment buttons 1076.4 for changing a particular valve position. As one example, a user of GUI 1021 can identify any of the velocity bins within column 1076.1, and press the appropriate up or down increment button 1076.2 to increase or decrease that velocity. Similarly, a user can identify any one of the valve position bins of column 1076.3 and activate the appropriate up or down increment button 1076.4 to change the value of the corresponding valve position.

In yet another embodiment, GUI 1021 includes displaying a measured parameter with the table 1076. For example, GUI 1021 can include the display of the current measured piston velocity and the current valve position. As another example, GUI 1021 can display data that corresponds to the range of valve positions measured within a velocity bin. As another example, GUI 1021 can include data that corresponds to the measured force of the shock absorber.

Figure 9:
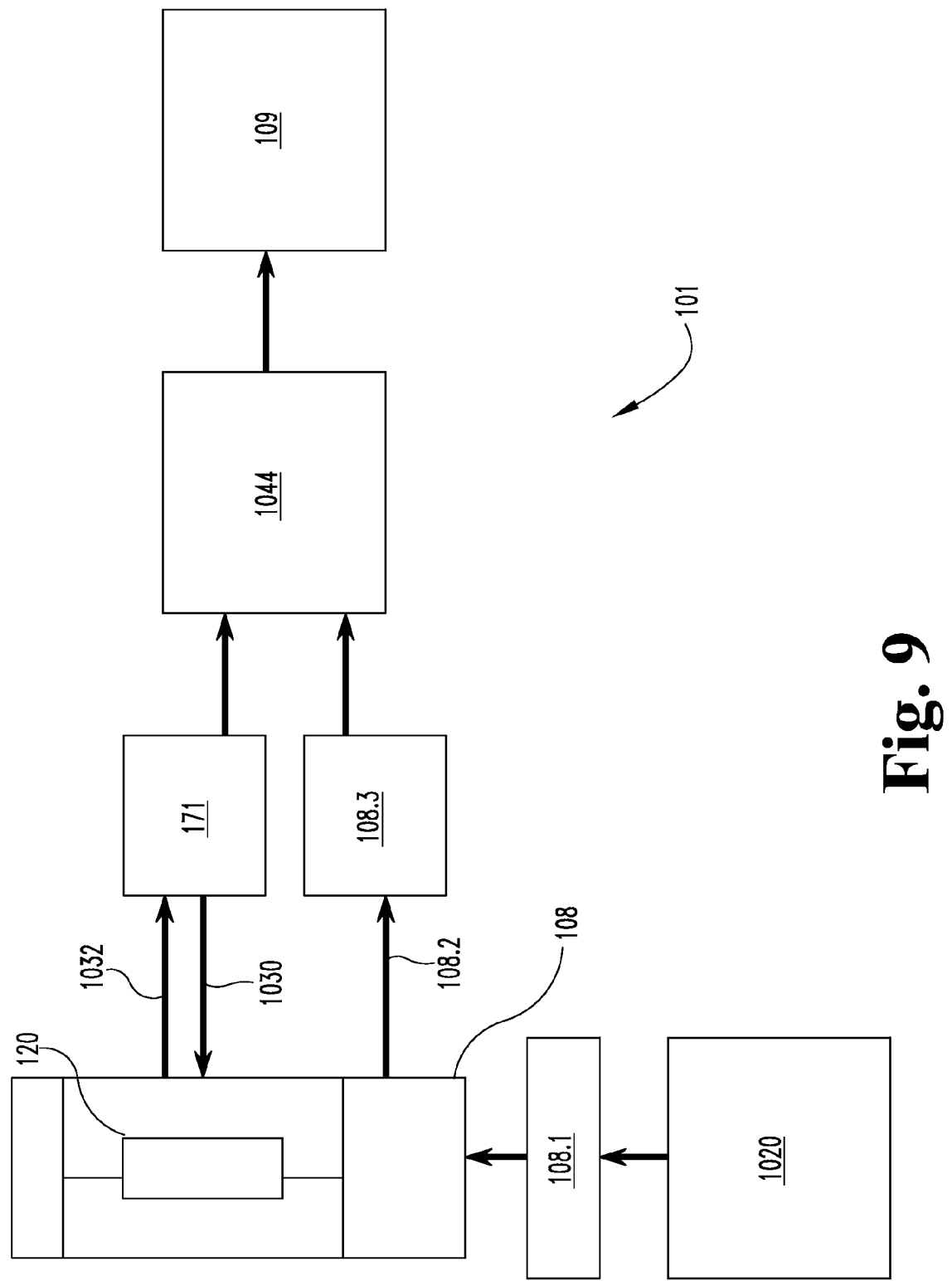
FIG. 9 is a schematic representation of a test method according to another embodiment of the present invention.

FIG. 9 is a schematic representation of a test method 101 according to another embodiment of the present invention. In one embodiment, test method 101 includes establishing a damping data structure prior to laboratory testing. Test method 101 includes an automatic method for establishing a baseline set of control valve positions that correspond to the damping data structure. This data structure of control valve positions can be used in any closed loop control of shock absorber characteristics that include an inner control loop that is a closed loop based on valve position. This valve position data structure can serve as an initial guess for the valve position as a function of stroking velocity, stoking acceleration, stroking displacement, or other shock absorber characteristics, as the case may be. Method 101 includes a shock absorber dynamometer 108 that provides mechanical excitation to an electrically adjustable shock absorber, such as shock absorbers 120, 220, or 320. As one example, dynamometer 108 is a shock absorber dynamometer as sold by the SPA Group of Lichfield, Staffs, U.K.

The suspension attachments of the shock absorber (such as attachments 126.3 or 226.3) are coupled to corresponding attachment points of dynamometer 108. An operator uses the dynamometer 108 to excite the shock absorber with a velocity input from a schedule of excitation 108.1. In some embodiments, the adjustable shock absorber includes a sensor that provides a signal 1032 corresponding to the damping adjustment of the shock absorber (such as a position sensor 173 or 273). This signal is interpreted by an electronic circuit 171 (which in one embodiment is a Moog controller part number M3000, which also provides in other embodiments a control signal 1030 to actuator 180 or 280). Dynamometer 108 provides electronic signals 108.2 corresponding to the stroking velocity of the shock absorber and the force applied by the dynamometer to the shock absorber.

As the shock absorber is excited, a software calibration algorithm prepares a data table of valve positions that correspond to a particular shock absorber operating point, which can be characterized in terms of stroking velocity, position, acceleration, and the like. As one example, the compiled data can include a range of velocities that correspond to a particular force, or alternatively in another embodiment a range of forces that correspond to a particular velocity. The range of data (force or velocity, and valve position) will include a distribution of values (in one case force, in the other case velocity) that include extraneous measured effects, such as hysteresis. This range of force or velocity data further corresponds to a measurement for the valve position made at that same time. The corresponding outliers of data can be eliminated manually by the user, or optionally eliminated by the software using various data selection algorithms that eliminate outliers and other "noise." In one embodiment, the range of data can be assessed statistically, and a value such as a medium or mean is calculated and selected.

After data has been taken at a particular excitation (such force or velocity) and a corresponding valve position has been established that relates to the output variable (velocity or force, respectively) that valve position can be utilized as part of an inner control loop within, for example, control algorithms 1034 and 1034.1. This calibration table provides the control algorithm first estimation of the valve position to achieve a particular velocity. The position, velocity, and force measurements are preferably arranged in a data table or schedule 1044. This data is subsequently stored on a storage medium 109 (including but not limited to RAM, ROM, a flash drive, CD, DVD, floppy disk, hard drive, or a memory whose contents can be provided to the Internet). The stored data 109 can be transported or transmitted to the testing system 100 for use of table 1044 during a vehicle test. In some embodiments of the present invention, the graphical user interface 1020 is used by the operator to generate an excitation schedule 108.1 which the operator uses to generate a shock absorber adjustment that corresponds to the desired force at a particular velocity.

There is a method according to one embodiment of the present invention for an algorithm that automatically programs a matrix that interrelates damping force, damping velocity, and valve position. The method includes a first control loop for auto-programming the valve openings for rebound operation. The method includes a second control loop for auto-programming the valve openings for compression operation.

For rebound operation, the control system identifies when the shock absorber is being excited by the dynamometer at a velocity corresponding to a velocity in a stored predetermined table. When the excitation is at the corresponding velocity, the control algorithm reads the load that is being measured and compares that measured load to the desired, tabular entry for the load corresponding to the excitation velocity. The algorithm then adjusts the valve opening to drive the valve position accordingly until the error between the measured load and the desired load is below a predetermined threshold. When that happens, the value of the valve position is stored in a table, and the algorithm proceeds to the next excitation velocity. The algorithm for compression operates in substantially the same manner.

The output of this method is a tabular representation of valve positions that correspond to a particular force and velocity. In one embodiment, the compression table is a two-dimensional table with rows and columns corresponding to velocity and force, respectively, and the specific entries in the table being the valve positions. These tables can then be used in the control algorithm for the multi-post or the on-vehicle testing, and used as initial estimations for the appropriate valve positions during testing, and this estimate can be altered in real time to more closely achieve the desired damper force, for those control algorithms that include damper force feedback. In yet other embodiments, these auto-programmed tables represent the valve position that is implemented without subsequent correction in those cases where damper force is not an input to the control algorithm.

Figure 10:
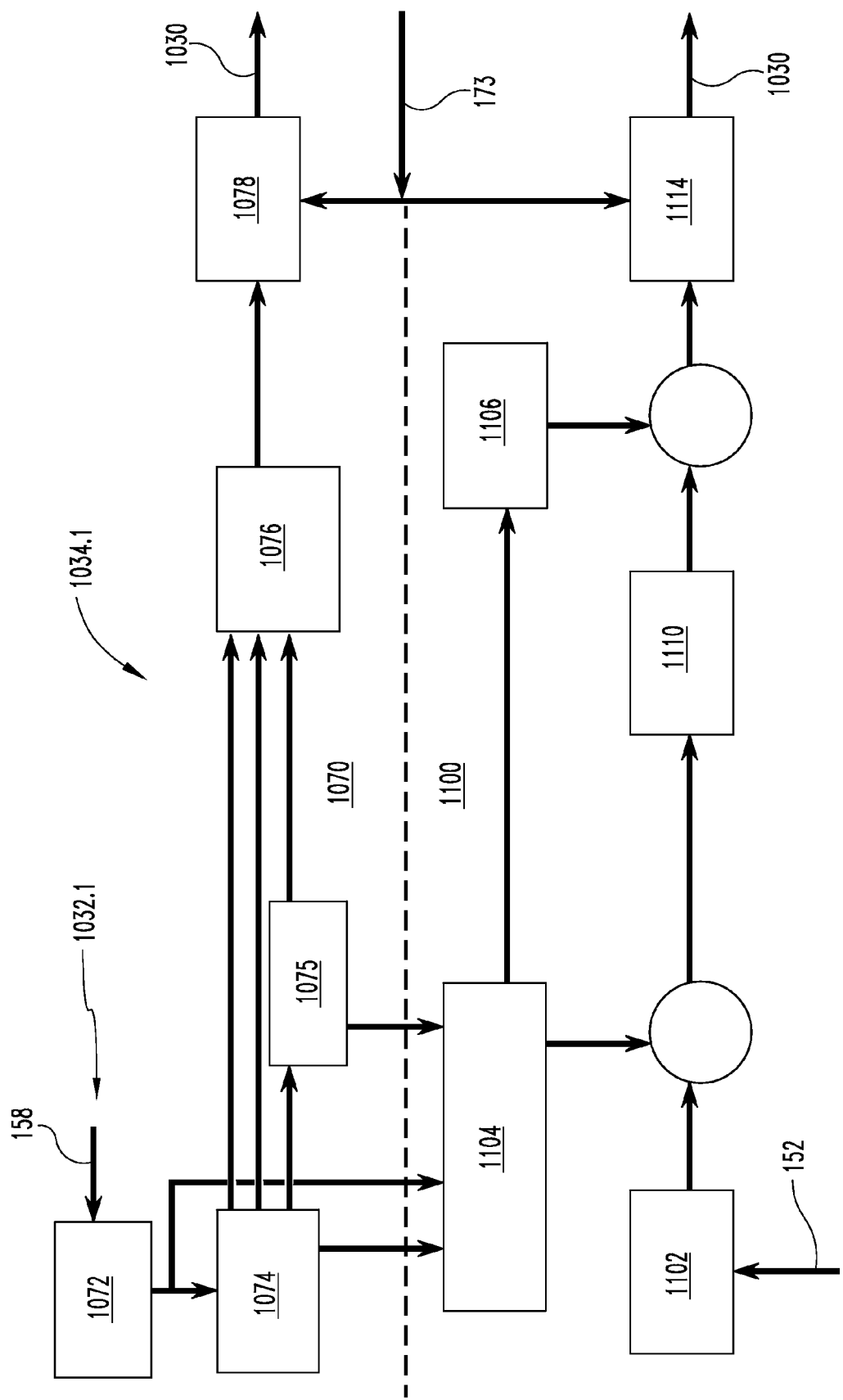
FIG. 10 is a block diagram of a control algorithm according to another embodiment of the present invention.

FIG. 10 is a block diagram representation of a control algorithm 1034.1 according to another embodiment of the present invention. Algorithm 1034.1 includes two different control loops 1070 and 1100, either of which can be selected by the user.

Control 1070 controls the position of an electronically adjustable shock absorber. A measured characteristic of the shock absorber 1032.1 (for example, such as from a velocity sensor 156 or 256) representative of the velocity of the shock absorber is received by a conversion algorithm 1072 which outputs velocity data corresponding to the relative velocity of the shock absorber piston. This positional data is received by an integrating block 1074 which uses the current velocity data and past velocity data to calculate data corresponding to the stroking displacement of the piston. In some embodiments, the velocity data is received by a derivative block 1075 which uses velocity data to calculate data corresponding to the stroking acceleration of the piston.

The velocity data and acceleration data is provided to a look-up table 1076 which associates the positional data, velocity data and acceleration data with a desired flow characteristic for the adjustable shock absorber. In one embodiment, the desired flow characteristics are the positions of a valve (such as from a sensor 173 or 273) which correspond to the pressure drop characteristics of the valve. The output of table 1076 is a desired valve position. This desired position is provided to an actuator drive algorithm 1078 which compares the desired position to the actual position of the actuated valve. A command output 1030 is provided by block 1078 to drive an actuator (such as actuator 180 or 280) to the proper position.

A force control algorithm 1100 is one alternative to the position control algorithm 1070. Force control algorithm 1100 includes a look-up table of forces 1104 that correspond to the calculated positional, velocity, and acceleration of the piston, as provided by calculation algorithms 1072, 1074, and 1075. Table 1104 provides a desired force to both a summing junction and also to a feedforward control block 1106. Table 1104 represents any tabular set of damper forces provided by the user, and as discussed herein, can be generated as to discrete numbers (such as on a spreadsheet), provided by a functional relationship, or estimated from the characteristics of a composite model of a shock absorber consisting of individually selected hydraulic flow or pressure regulation devices.

As one example, Table 1104 includes a plurality of tables related to the spatial relationship of one end of the shock absorber relative to the other end of the shock absorber. As one example, one or more of the look up tables can provide anti bottoming protection to the vehicle suspension. For example, as the shock absorber moves toward a relative spatial position of maximum compression, the damping forces can be increased significantly for a given velocity, and thereby provide protection to avoid metal to metal contact within the damper, with the subsequently high loads imparted to the vehicle suspension.

In yet another embodiment, Table 1104 includes a regressive relationship of damping force as a function of velocity. For example, at relative low stroking velocities there is a damping relationship corresponding to a restrictive flow path. In a high velocity regime there is a force versus velocity characteristic that is representative of a less restrictive flow path. These two regions are preferably linked by a third region of intermediate stroking velocity in which the damping force decreases with increasing stroking velocity, until the high velocity regime gets established. This regressive characteristic provides relatively stiff suspension characteristics at lower velocities, transitioning to softer characteristics at higher velocities.

In yet anther embodiments of the present invention, Table 1104 includes a relationship of damper force versus stroking velocity that depends upon the stroking acceleration of the piston. As one example, the electronically controlled shock absorber can be controlled to include hysteresis effects. In one case, the hysteresis can be related to a change in the stored energy of the shock absorber, such as energy stored in terms of fluid compressibility or elastic expansion of the shock absorber body as a pressure vessel. As the shock absorber accelerates in one direction, this energy is stored, and then released when the shock absorber accelerates in the opposite direction. Further, the magnitude of this hysteresis effect is related to the operating internal pressure of the shock absorber, which as previously been discussed, can be a function of shock absorber relative position (such as when the shock absorber computer model includes antibottoming characteristics) or stroking velocity (such as when the shock absorber computer model includes a regressive characteristic).

In yet other embodiments, the look up table or other relationship includes one or more relationships of damper force versus of stroking velocity that take into account a change in the sign of stroking acceleration. For example, as the sign of stroking acceleration changes from positive to negative (or negative to positive) a different set of damping force values are chosen to take into account hysteresis effects such as shifting in seal position or mechanical looseness in the shock absorber or the suspension.

Further, it is understood that the present invention contemplates algorithms in which there is a tabular relationship between damper force and stroking velocity, with the effects of stroking position or stroking acceleration are taken into account as incremental force changes or as force multiplier changes. For example, antibottoming characteristics can be implemented by multiplying the output of Table 1104 by a number greater than one as the stroking positional data corresponds to near-full compression. Alternatively, this anti bottoming protection could be provided as an increment in the desired force that is added to the output of Table 1104.

Further still, a regressive relationship can be established by multiplying the output of Table 1104 by a number less than one in an intermediate stroking velocity regime, and subsequently increasing that multiplier in a higher stroking velocity regime. In addition, the regressive characteristic can be achieved by decrementing the output of Table 1104 in an intermediate stroking velocity regime, decreasing the decrement as stroking velocity transitions to a higher speed regime, and ultimately incrementing the output of the Table in the highest stroking velocity regimes.

With regard to stroking acceleration, the output of Table 1104 can be multiplied by a number less than one as the absolute value of the magnitude of stroking acceleration increases, and multiplied by a number greater than one when the absolute value of the magnitude of stroking acceleration decreases. Further still, these changes in value of the absolute magnitude can be implemented by a decrement or increment, respectively, to the force selected in Table 1104.

The actual force of the shock absorber (for example, such as measured by a load sensor 152 or 252) is provided to a force signal conversion algorithm 1102 which provides data corresponding to the measured force applied to the shock absorber to the first summing junction. The measured force from block 1102 and the desired force from table 1104 are compared, and the difference in the signals is provided to a PID control algorithm 1110. PID controller 1110 provides the appropriate filtering to the error signal, relative to the proportion, integral, and derivative of the error signal to a second summing junction. At this second summing junction the output of PID control 1110 is added to the output of the feed forward control filter 1106. The resultant signal is provided to an actuator drive algorithm 1114 which determines how to position the actuated valve of the adjustable shock absorber (such as to valve assembly 170 or 270), and provides a command signal 1030 to the actuator (such as 180 or 280).

Figure 15:
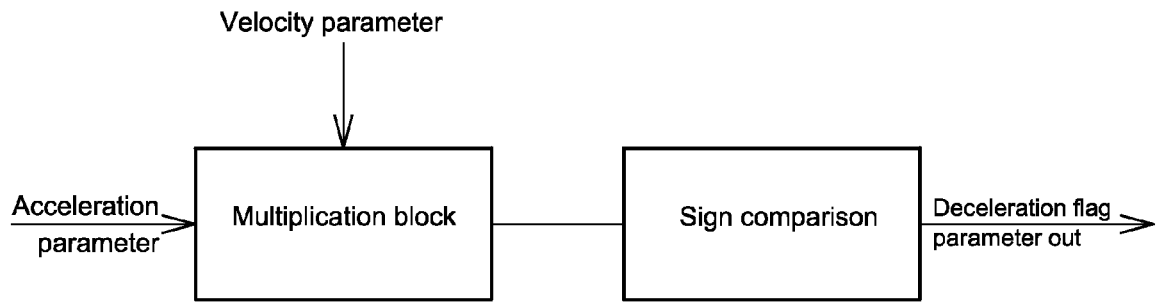
FIG. 15 is a diagrammatic representation of software according to one embodiment of the present invention.
Figure 16:
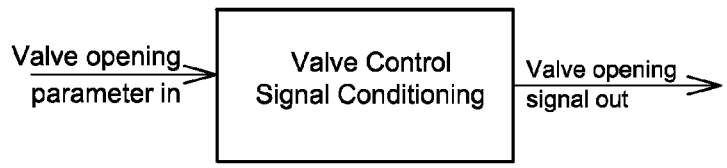
FIG. 16 is a diagrammatic representation of software according to one embodiment of the present invention.
Figure 17:
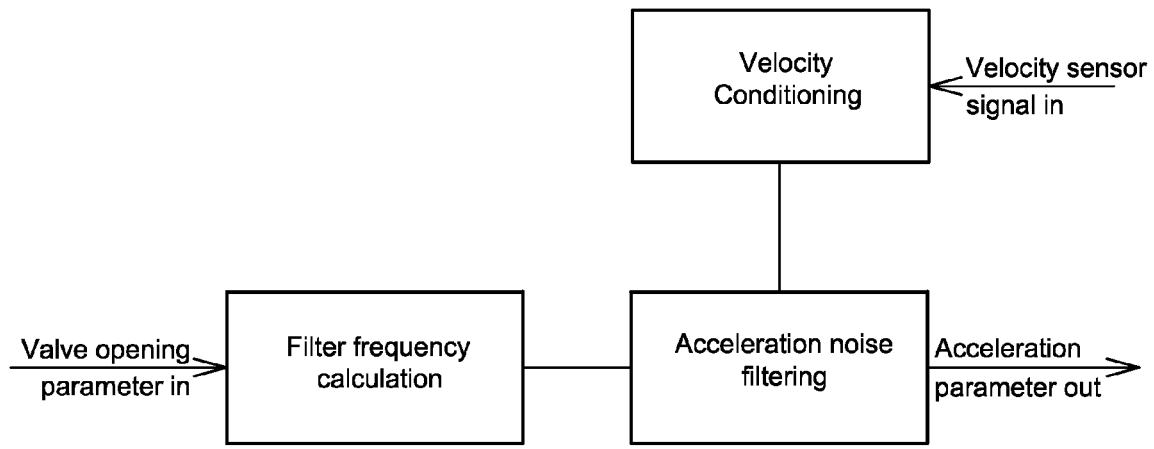
FIG. 17 is a diagrammatic representation of software according to one embodiment of the present invention.
Figure 18:
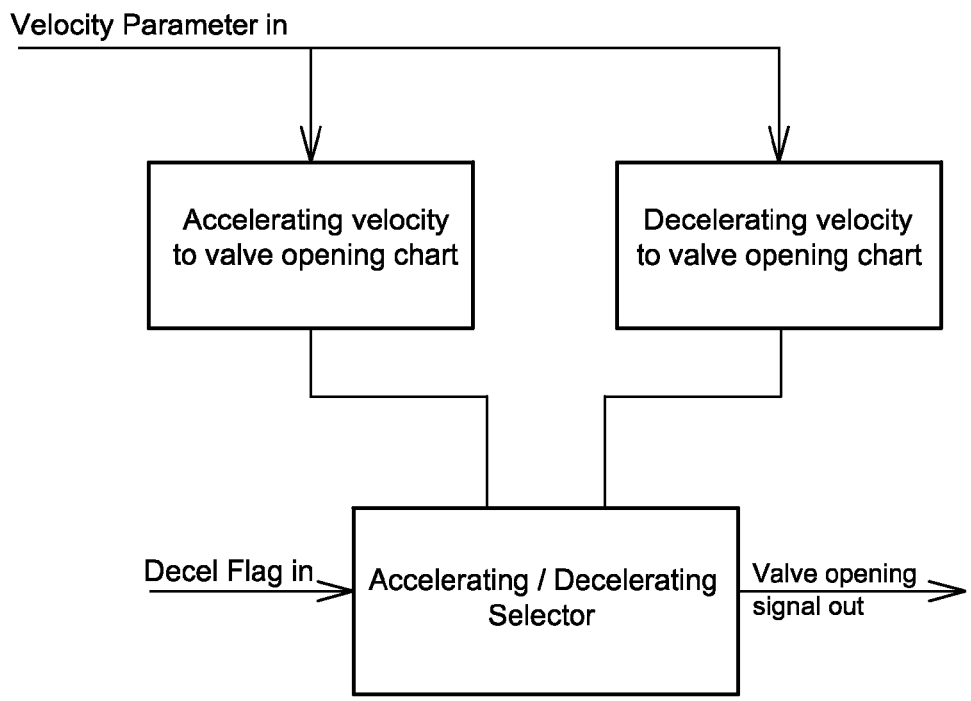
FIG. 18 is a diagrammatic representation of software according to one embodiment of the present invention.
Figure 19:
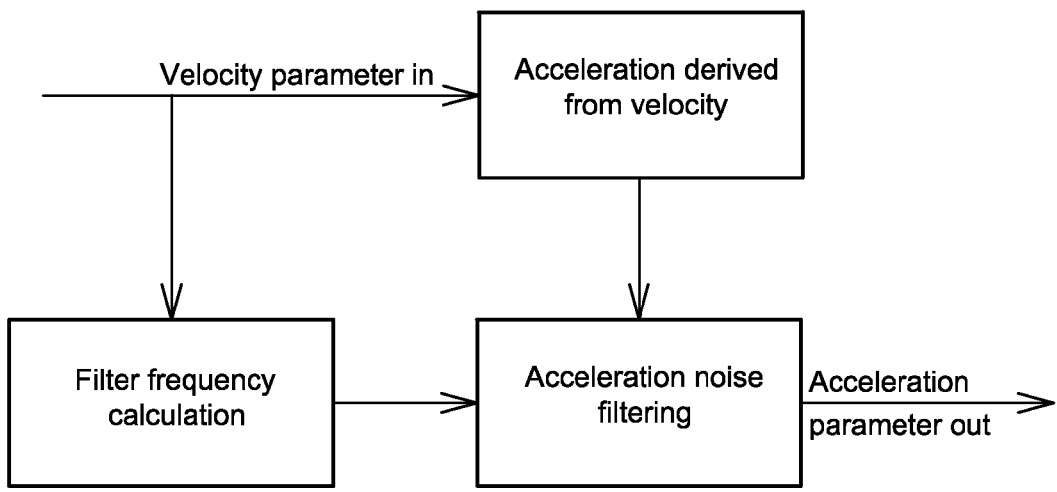
FIG. 19 is a diagrammatic representation of software according to one embodiment of the present invention.

FIGS. 15, 16, 17, 18, and 19, depict block diagrams of a control algorithm according to another embodiment of the present invention for controlling an electronically adjustable damper. FIG. 17 shows a signal from the velocity sensor being received by a velocity conditioning block, the output of which is a conditioned velocity signal. FIG. 17 further shows an acceleration value being received by a block that calculates a filter break frequency. The output of that block is a break frequency which is then supplied to a velocity filtering block, as is the conditioned velocity data. The output of this filtering block is a velocity parameter, as shown and used in FIG. 15. FIG. 19 shows the velocity parameter being received by two logic blocks: one logic block derives an acceleration value from the velocity parameter. In parallel, another logic block receives the velocity parameter and outputs a calculated break frequency. This break frequency is provided to an acceleration noise filter; the derived acceleration parameter is also provided to the noise filter. The output of this noise filter is the acceleration parameter used in FIG. 15. FIG. 15 shows a first block (from left to right) that multiplies the velocity parameter by the acceleration parameter. The output from this multiplication block is then received by a sign comparison block that sets a deceleration flag parameter to 0 or 1 based on whether the sign of the velocity and acceleration product is positive or negative.

FIG. 18 shows that the velocity parameter is received in parallel by two logic blocks: a first logic block associates an accelerating velocity to a valve opening chart; the second block associates a decelerating velocity to a valve opening chart. The output of both of these blocks are provided to an accelerating/decelerating selector block. This block further receives the decel flag established as the deceleration flag parameter in FIG. 15. Based on the logical value of this decel flag, the valve opening from either the accelerating velocity chart or the decelerating velocity chart is selected, and the output is a valve opening signal. FIG. 16 shows a block that receives this valve opening signal as an input parameter, and provides it to an algorithm that provides signal conditioning of this valve opening data. The output of this block is converted from a digital to analog signal and drives the electronically controllable valve of the electronically adjustable shock absorber.

Operation of a test method according to one embodiment of the present invention proceeds as follows: referring to FIGS. 5 and 6, a vehicle 102 is provided with one or more electronically adjustable shock absorbers (such as shocks 120 or 220), and is placed on a seven-post rig, as best seen in FIG. 5. The user provides a data structure 1044 which is interpreted by a control software algorithm 1034 operating within a digital processor 1012 into a format of controllable, desired damping characteristics. As examples, the input damping data structure 1044 can be provided from an external data source such as a CD-ROM, generated by the user as an Excel® spreadsheet, as one or more functional relationships expressed as mathematical equations, or constructed as a composite of graphically-defined suspension components. Entry of this damping data structure 1044 is facilitated into processor 1012 by a graphical user interface 1020, such as a mouse-driven display 1018 or a touch screen.

Control algorithm 1034 interprets the damping data structure 1044 into an estimate of the position of the spool valve 172 within housing 174. Control algorithm 1034 thereby places the spool valve at the appropriate estimated position to provide the appropriate pressure drop (and damper force) desired for the instantaneous position and velocity of rod 126.

The test operator monitors the performance of vehicle 102, such as position, velocity, or acceleration of the vehicle frame, the loads in the shock absorber, or any other desired output. If the vehicle responses are inadequate, the operator can modify or replace the damping data structure 1044 and continue testing.

One embodiment of the present invention pertains to a method for testing a vehicle suspension. The method also includes providing a vehicle having a frame and at least two wheels and at least one actuator for displacing at least one wheel, a shock absorber with electrically adjustable damping for damping the frame relative to the one wheel, a sensor for measuring a characteristic of the shock absorber, and a computer having software and being operably connected to the shock absorber and being in electrical communication with the sensor. The method also includes moving the one wheel with the actuator. The method also includes measuring the characteristic of the shock absorber by the computer during said moving. The method also includes comparing the measured characteristic to a desired characteristic of the shock absorber stored in the software. The method also includes adjusting the damping of the shock absorber by the computer in response to said comparing.

One embodiment of the present invention pertains to a method for testing the suspension of a vehicle with a computer system having a graphical user interface including a display and a user interface selection device. The method also includes providing a software algorithm to the computer system for controlling the damping characteristics of the shock absorbers of the suspension. The method also includes providing a damping data structure to the computer system. The method also includes displaying a menu of the algorithm on the display having at least one menu entry corresponding to the desired damping characteristics of the suspension. The method also includes selecting the menu entry with the device. The method also includes associating the data structure with the selected menu entry, wherein the software algorithm is operable with the data structure.

One embodiment of the present invention pertains to a method for testing a vehicle suspension. The method also includes providing a shock absorber having electrically adjustable damping characteristics, a shock absorber dynamometer, a first sensor providing a signal corresponding to the adjustment of the shock absorber, a second sensor providing a signal corresponding to the excitation of the shock absorber by the dynamometer, a vehicle suspension, and a test rig for operating the suspension. The method also includes exciting the shock absorber by the dynamometer. The method also includes determining a schedule of damping adjustments as a function of excitation. The method also includes storing the schedule with an electronically readable storage medium. The method also includes operating the suspension with an electrically adjustable shock absorber on the test rig according to the stored schedule.

One embodiment of the present invention pertains to a hydraulic shock absorber. The shock absorber also includes a cylinder containing hydraulic fluid. The shock absorber also includes a piston dividing said cylinder into a first chamber and a second chamber. The shock absorber also includes a rod connected to said piston and extending from said cylinder. The shock absorber also includes a valve movable within a housing having a first port and a second port, said first port being in fluid communication with the first chamber, said second port being in fluid communication with the second chamber, said valve and said housing being external to said cylinder, said valve having a variable flow characteristic between the outlet and the inlet. The shock absorber also includes an electrical actuator for varying the flow characteristic of said valve, said actuator being external to said cylinder. The shock absorber also includes a position sensor providing a signal corresponding to the position of said valve relative to said housing.

One embodiment of the present invention pertains an apparatus for testing a vehicle suspension. The apparatus also includes a hydraulic shock absorber having first and second internal fluid chambers separated by a piston. The apparatus also includes a valve assembly permitting fluid communication between the first and second chambers of said shock absorber, said valve assembly including a spool valve movable within a housing, said spool valve providing a flow and pressure characteristic between said first and second chambers. The apparatus also includes an electrical actuator for varying the characteristic of said spool valve by moving said spool valve. The apparatus also includes a position sensor providing a signal corresponding to the position of said spool valve relative to said housing. The apparatus also includes a velocity sensor providing a signal corresponding to the velocity of said piston.

One embodiment of the present invention pertains to system for testing a vehicle suspension. The system also includes a vehicle having a frame supportable by four wheels. The system also includes a testing machine having a plurality of actuators, each said actuator capable of displacing a corresponding wheel. The system also includes a plurality of hydraulic shock absorbers each having electronically adjustable damping, each said shock absorber providing damping of the frame relative to a different one of the actuated wheels. The system also includes a plurality of sensors each measuring a characteristic of a corresponding said shock absorber and each providing a signal corresponding thereto. The system also includes an electronic controller operably connected to said plurality of shock absorbers and receiving said plurality of signals, said controller capable of electronically adjusting the damping of each said shock.

One embodiment of the present invention pertains to a computer system having a graphical user interface including a display and a user interface selection device, a method of altering the damping characteristics of a suspension. The system also includes retrieving a set of data that relates the velocity of a shock absorber to a desired damping characteristic. The system also includes displaying the set of data on the display. The system also includes displaying a feature on the display that permits the user to change the data with the selection device. The system also includes storing the changed data. The system also includes executing an algorithm with the changed data that alters the damping characteristics of the suspension.

Yet another embodiment of the present invention pertains to a method of controlling an electronically controllable shock absorber with a regressive force versus velocity characteristic. The control algorithm includes a first data set corresponding to a first, more restrictive damping characteristic, such as the flow characteristic of a shimmed one way valve. The algorithm includes a second data set corresponding to a second, less restrictive damping characteristic, such as a shimmed one way valve with less shim force. This first data set is used over a first, lower range of stroking velocities. The second data set is used over a second, higher range of stroking velocities. Preferably, the two velocity ranges are separated. A third damping characteristic provides a preferably smooth transition from the first damping characteristic to the second damping characteristic, and is used within the third, intermediate range of velocity values. In some embodiments, the regressive characteristic is implemented in the rebound direction, whereas in other embodiments it is implemented in the compression direction, and in some embodiments it is implemented in both directions.

Yet another embodiment of the present invention pertains to a method for controlling an electronically controllable shock absorber to include an antibottoming characteristic. The method includes a control algorithm that operates the shock absorber in accordance with damping characteristics as a function of stroking displacement. The electronically controlled shock absorber includes a sensor capable of providing a signal that can represent stroking displacement. If the measured stroking displacement indicates that the shock absorber is within a predetermined range of full compression (or alternatively, full rebound), the damping characteristics of a shock absorber are increased, with the increase progressing as the shock absorber moves further toward full compression.

As one example, when the calculated stroking displacement reaches a predetermined value that is near full compression, the control algorithm can increment the force that would otherwise be used for the corresponding stroking velocity. Alternatively, the damping force related to that velocity can be multiplied by a number greater than 1, or otherwise established by a functional relationship such as a polynomial relationship that includes stroking displacement as an input variable. In yet other embodiments, the value of the stroking displacement used to select an alternative data table of damper force and stroking velocity.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:
   providing a wheel suspended from a frame by a vehicular suspension;
   providing a shock absorber with electronically adjustable damping for damping the frame relative to the wheel, the shock absorber including
      a piston slidable within a closed cylinder, said piston dividing the interior of the cylinder into first and second chambers, and
      a spool valve external to the cylinder and having an inlet in fluid communication with the first chamber and an outlet in fluid communication with the second chamber, the spool valve being electronically actuatable to vary flow of hydraulic fluid from one chamber to the other chamber;
   providing a sensor for measuring a characteristic of the shock absorber;
   providing a computer having software and being operably connected to the shock absorber and being in electrical communication with the sensor;
   creating a data set with the software corresponding to a predetermined relationship between the stroking velocity of the shock absorber and the desired force exerted by the shock absorber;
   measuring the characteristic of the shock absorber by the computer as the wheel moves relative to the frame;
   using the measured characteristic by the software and selecting data from the data set corresponding to the desired force; and
   automatically adjusting the damping of the shock absorber by the computer in response to said selecting.

2. The method of claim 1 wherein the characteristic is stroking velocity and the predetermined relationship is a tabular relationship relating stroking velocity to damper force.

3. The method of claim 1 wherein the characteristic is stroking velocity and the predetermined relationship is a functional relationship relating stroking velocity to damper force.

4. The method of claim 1 wherein the predetermined relationship is a composite of hydraulic valve relationships relating stroking velocity to damper force, and which further comprises establishing the composite relationship from a graphical user interface.

5. The method of claim 4 wherein the hydraulic valve relationship corresponds to the flow characteristics of a one-way valve in the piston of the shock absorber at least partly covered by a flexible shim.

6. The method of claim 1 wherein the measured characteristic is one of damper force, shock absorber stroking velocity, or shock absorber stroking displacement.

7. The method of claim 1, further comprising:
   moving the wheel relative to the frame using a test rig.

8. The method of claim 1 further comprising:
   providing a vehicle having four wheels, wherein the frame is the vehicle frame, and wherein said moving is by driving the vehicle.

9. The method of claim 1 wherein said providing a wheel includes a vehicle having four wheels, wherein the frame is the vehicle frame.

10. The method of claim 9 wherein the test rig is a multiple-post test rig.

11. The method of claim 1 wherein the piston includes a first flowpath for flow of hydraulic fluid through the piston from the first chamber to the second chamber and a second flowpath for flow of hydraulic fluid through the piston from the second chamber to the first chamber.

12. The method of claim 11 wherein the first flowpath includes a first one-way valve in the piston and the second flowpath includes a second one-way valve in the piston, the flow orientation of the first one-way valve being opposite of the flow orientation of the second one-way valve.

13. The method of claim 12, further comprising:
   providing a third flowpath between the spool valve inlet and spool valve outlet, the third flowpath being in parallel with the spool valve and adapted to permit flow from the first chamber to the second chamber and permit flow from the second chamber to the first chamber; and
   controlling the flow of fluid along the third flowpath with an adjustable valve.

14. The method of claim 1, further comprising:
   providing a parallel flowpath between the spool valve inlet and spool valve outlet, the parallel flowpath being in parallel with the spool valve and adapted to permit flow from the first chamber to the second chamber and permit flow from the second chamber to the first chamber; and
   controlling the flow of fluid along the parallel flowpath with an adjustable valve.

15. The method of claim 1 wherein the predetermined relationship include hysteresis.

16. The method of claim 1 wherein said providing a shock absorber includes providing a shock absorber with hydraulic fluid.

17. The method of claim 1 wherein the computer is operably connected with a graphical user interface including a display and a user interface selection device, and which further comprises:
   displaying a menu on the display having at least one menu entry corresponding to a desired damping characteristic;
   selecting the menu entry with the device; and
   using the menu entry in said creating a data set.

18. The method of claim 17 wherein said providing a wheel includes a vehicle having at least one wheel on the right side and at least one other wheel on the left side, the frame is the vehicle frame, and at least one of the entries of the menu corresponds to a relationship between the desired damping characteristics of the right side of the vehicle and the desired characteristics of the left side of the vehicle.

19. The method of claim 17 wherein the data set includes a table having at least two dimensions.

20. The method of claim 17 wherein at least one of the entries of the menu corresponds to the flow characteristics of a fixed restriction.

21. The method of claim 17 wherein at least one of the entries of the menu corresponds to the flow characteristics of a null zone of damping.

22. The method of claim 17 wherein at least one of the entries of the menu corresponds to a shock absorber having a regressive force characteristic.

23. The method of claim 17 wherein at least one of the entries of the menu corresponds to a shock absorber having an antibottoming force characteristic.

24. The method of claims 17 wherein at least one of the entries of the menu corresponds to a shock absorber having a shimmed one-way valve.

25. The method of claims 17 wherein at least one of the entries of the menu corresponds to a shock absorber having a check valve.

26. A method of electronically controlling a hydraulic shock absorber, comprising:
   providing a hydraulic shock absorber with an electronically controllable hydraulic valve for controlling the damping of the shock absorber, the shock absorber having a first end movable relative to a second end;

predetermining a relationship between a desired damping force and the velocity of the first end relative to the second end;

preparing a first signal corresponding to the relative velocity of the ends;

preparing a second signal corresponding to the relative acceleration of the ends;

using the first signal for selecting data from the relationship corresponding to a first damping force;

using the second signal for modifying the data; and adjusting the position of the valve in response to the modified data.

27. The method of claim 26 wherein said modifying is by adding one of an increment or a decrement to the first force.

28. The method of claim 26 wherein said modifying is by multiplying the first force by a number other than one.

29. The method of claim 26 wherein the relationship includes a plurality of tables, the data corresponds to a range of damping force values, and said modifying includes selecting at least one force value from the range.

30. The method of claim 26 wherein the hydraulic valve is a spool valve.

31. The method of claim 26 wherein said providing includes providing a hydraulic shock absorber with hydraulic fluid.

32. The method of claim 26 wherein the shock absorber includes:
a piston slidable within a closed cylinder, said piston dividing the interior of the cylinder into first and second chambers, and the hydraulic valve is a spool valve having an inlet in fluid communication with the first chamber and an outlet in fluid communication with the second chamber.

33. The method of claim 32, wherein the shock absorber includes a piston slidable within a closed cylinder, said piston dividing the interior of the cylinder into first and second chambers, and the hydraulic valve has an inlet in fluid communication with the first chamber and an outlet in fluid communication with the second chamber, the method further comprising:
providing a parallel flowpath between the hydraulic valve inlet and hydraulic valve outlet, the parallel flowpath being in parallel with the hydraulic valve and adapted to permit flow from the first chamber to the second chamber and permit flow from the second chamber to the first chamber; and
controlling the flow of fluid along the parallel flowpath with an adjustable valve.

34. The method of claim 32 wherein the piston includes a first flowpath for flow of hydraulic fluid through the piston from the first chamber to the second chamber and a second flowpath for flow of hydraulic fluid through the piston from the second chamber to the first chamber.

35. The method of claim 34 wherein the first flowpath includes a first one-way valve in the piston and the second flowpath includes a second one-way valve in the piston, the flow orientation of the first one-way valve being opposite of the flow orientation of the second one-way valve.

36. The method of claim 35, further comprising:
providing a third flowpath between the spool valve inlet and spool valve outlet, the third flowpath being in parallel with the spool valve and adapted to permit flow from the first chamber to the second chamber and permit flow from the second chamber to the first chamber; and
controlling the flow of fluid along the third flowpath with an adjustable valve.

* * * * *